United States Patent [19]
Simpson et al.

[11] Patent Number: 4,864,588
[45] Date of Patent: Sep. 5, 1989

[54] REMOTE CONTROL SYSTEM, COMPONENTS AND METHODS

[75] Inventors: Raymond W. Simpson, Hamilton Square; Donald G. Chandler, Pennington; John Bowers, Monmouth Junction, all of N.J.

[73] Assignee: Hillier Technologies Limited Partnership, Washington Crossing, Pa.

[21] Appl. No.: 13,577

[22] Filed: Feb. 11, 1987

[51] Int. Cl.⁴ .................. H02J 13/00; H04B 1/66
[52] U.S. Cl. ........................ 375/1; 375/114; 375/115; 375/116
[58] Field of Search .............. 375/1, 55, 95, 110–116

[56] References Cited

U.S. PATENT DOCUMENTS

| | | | |
|---|---|---|---|
| 3,251,034 | 5/1966 | Goode et al. | 375/114 |
| 3,317,669 | 5/1967 | Ohnsorge | 375/116 |
| 3,361,978 | 1/1968 | Fiorini | 375/55 |
| 3,403,377 | 9/1968 | Connolly et al. | 371/47 |
| 3,491,338 | 1/1970 | Malloy | 375/111 |
| 3,560,860 | 2/1971 | Gueldenpfennig | 375/114 |
| 3,651,263 | 3/1972 | Lindback et al. | 375/114 |
| 3,701,019 | 10/1972 | Jackson | 375/1 |
| 3,761,817 | 9/1973 | Kaltschmidt et al. | 375/1 |
| 3,761,891 | 9/1973 | Markwitz | 371/46 |
| 3,789,303 | 1/1974 | Hoffman et al. | 375/110 |
| 3,810,155 | 5/1974 | Widl et al. | 375/55 |
| 3,818,348 | 6/1974 | Puente | 375/116 |
| 3,961,138 | 6/1976 | Fellinger | 375/111 |
| 4,027,335 | 5/1977 | Miller | 375/55 |
| 4,122,393 | 10/1978 | Gordy et al. | 375/1 |
| 4,242,664 | 12/1980 | Lindstedt et al. | 375/1 |
| 4,255,742 | 3/1981 | Gable et al. | 375/19 |
| 4,270,208 | 5/1981 | MacDavid | 375/94 |
| 4,276,656 | 6/1981 | Petryk, Jr. | 375/113 |
| 4,313,206 | 1/1982 | Woodward | 375/110 |
| 4,320,525 | 3/1982 | Woodward | 375/110 |
| 4,355,398 | 10/1982 | Cook | 375/110 |
| 4,400,790 | 8/1983 | Chambers et al. | 375/115 |
| 4,455,651 | 7/1984 | Baran | 375/1 |
| 4,532,635 | 7/1985 | Mangulis | 375/1 |
| 4,538,281 | 8/1985 | Rajan | 375/1 |
| 4,542,420 | 9/1985 | Kozlik et al. | 375/94 |
| 4,547,890 | 10/1985 | Gindi | 375/19 |
| 4,550,414 | 10/1985 | Guinon et al. | 375/1 |
| 4,554,540 | 11/1985 | Mori et al. | 375/116 |
| 4,559,633 | 12/1985 | Kan et al. | 375/1 |
| 4,561,089 | 12/1985 | Rouse et al. | 375/1 |
| 4,583,231 | 4/1986 | Puckette | 375/1 |
| 4,641,322 | 2/1987 | Hasegawa | 375/1 |
| 4,663,767 | 5/1987 | Bodlaj et al. | 375/55 |
| 4,694,467 | 9/1987 | Mui | 375/1 |

FOREIGN PATENT DOCUMENTS

| | | |
|---|---|---|
| 0195573 | 9/1986 | European Pat. Off. |
| 0200016 | 11/1986 | European Pat. Off. |
| 2329036 | 5/1977 | France |
| 2577733 | 8/1986 | France |

OTHER PUBLICATIONS

Lightfoot et al., IEEE Transactions on Communications Technology, vol. COM 1–3, No. 1, Mar. 1965, "A Compact HF Digital Modem with Interference and Multipass Discrimination Characteristics".

Kowatch et al., IEEE Transactions on Sonics and Ultrasonics, vol. FU-32, No. 5, Sep. 1985, "An Application of SAW Convolvers to Spread-Spectrum Transmission of Packet Voice".

Data Sheet "TDC1004" by TRW Electronic Components Group, LSI Products Division, Publication No. 4DG00274, Revision (Rev.) F, dated 3/85.

*Primary Examiner*—Salvatore Cangialosi
*Attorney, Agent, or Firm*—Lerner, David, Littenberg, Krumholz & Mentlik

[57] ABSTRACT

A remote control system utilizing spread-spectrum techniques. The system is particularly suitable for control of electrical wiring devices in a building and/or appliances.

28 Claims, 14 Drawing Sheets

REMOTE CONTROL SYSTEM, COMPONENTS AND METHODS

BACKGROUND OF THE INVENTION

The present invention relates to remote-control systems. The invention is particularly useful in control of electrical devices in a building and in control of appliances.

Conventional switches used in building electrical power systems are connected in the power supply wiring of the building between the power source and the loads controlled by the switches. Accordingly, the power wiring of the building must extend to each switch and from each switch to the load. An ordinary wall switch controlling a ceiling light fed by an electric power wire in the ceiling thus requires a branch extending down from the ceiling through the wall to the switch and back up through the wall to the light fixture. Such branch wiring requires expensive materials, such as high voltage cable, junction boxes and the like, to handle the electrical power. Moreover, expensive, skilled labor is required to install such branches during construction of the building. Even more labor is required to install such a switching branch in a completed building, where the branch wiring must be worked through existing walls.

All of these problems are even more severe where a load must be controlled from more than one switch. The conventional "three way" switch arrangement utilized to control a ceiling light from either end of a stairway requires a switching branch extending from the power supply wiring to one switch, from that switch to the other switch and from the other switch to the light. Where a single load is to be controlled by more than two switches, the required interconnections become even more complex and costly.

Low voltage remote control systems bring only low voltages to the switches and use the switched low voltage to control relays or other high voltage switching devices in the building wiring system. These systems eliminate the need for high voltage components in the switching branches, but do not eliminate the need for a wired connection between the switch and the controlled device. Therefore, substantially the same labor costs are involved in installation of these systems. Moreover, the relays required at the controlled devices add significant costs.

Another remote control system which has been utilized to some extent in building wiring is the "carrier current" system. In the carrier current system, the control switch actuates a small radio frequency transmitter which is connected to the building wiring so that the radio signal propagates through the wiring to a receiver mounted on the controlled device. The receiver actuates a relay or electronic switch controlling the power flow to the device. Each transmitter must be directly connected to the wiring, thus restricting the versatility of the system and adding to its cost. Moreover, carrier current systems typically convey information only at relatively low rates and typically can control only a few devices in a given system. There is a considerable possibility of interference between multiple carrier current systems as, for example, where carrier current systems are used in multiple homes served by a common supply transformer. Conversely, carrier current systems cannot pass information between locations served by different supply transformers, and hence are unsuitable for use in large buildings with multiple supply transformers. Also, carrier current systems typically encounter difficulties with spurious signals caused by random electrical noise on the power line. These and other difficulties have limited application of carrier current systems.

Attempts have been made heretofore to eliminate the difficulties associated with wired and carrier current systems by using free space communication for control purposes, i.e., by directing the control signal from a transmitter through free space within the building to a receiver at the fixture. With free space propagation, the transmitter location is unrestricted and the costs of switch wiring are eliminated. Control signals can in theory be propagated through free space as acoustic signals such as ultrasonic waves or as optical signals, i.e., light beams. These techniques are used in limited applications such as television remote controls and the like where there is only a short gap between the transmitter and receiver and where there is direct line of sight communication between the two. As these favorable conditions are not always present in a building wiring control system, these acoustic and optical systems typically are unsuitable for controlling electrical power within a building.

Attempts have been made to utilize radio control systems for certain limited aspects of building power and/or appliance control as, for example, garage door openers, individual power outlet controls and the like. These systems, however, have been unreliable inasmuch as they are subject to unintended actuation by interfering radio transmitters and, conversely, sometimes fail to actuate the controlled device. To avoid interference with other radio equipment, the transmitters used in these radio control systems are required to be low power devices, thus limiting the range of the system. Additionally, the transmitters and receivers used in these radio control devices have not been suited for mounting within the junction boxes normally used in electrical wiring systems. These junction boxes often are metal enclosures which tend to attenuate radio signals. To receive the weak signals provided by the low powered transmitters, the receiver must either be mounted outside of the junction box or provided with an antenna structure extending out from the box, rendering the entire device cumbersome and unsightly. Moreover, most radio control systems available heretofore have required expensive components. For all of these reasons, radio control systems have not been widely adopted in building wiring systems.

Thus, although there has been an acute need for an inexpensive, reliable and versatile wireless or free space power control system suitable for use in a building power system, no such control system has been available heretofore. The same need for a reliable remote control system exists in the case of thermostats, doorbells and other devices which must actuate another unit at a remote location. There is a similar unmet need with respect to wireless control systems for appliances. Although appliances have been provided heretofore with the short range, line of sight optical and acoustic remote control systems mentioned above, and with rudimentary, unreliable radio control units, there has been no truly satisfactory system for wireless remote control of electrical appliances. The need with respect to remote control of appliances has become more acute with the advent of home automation systems. Modern data processing technology can provide a central automation system capable of controlling and coordinating many appliances within the home, and also coordinating building fixtures such as lights, heaters and alarms. Heretofore, the difficulty and expense of communication between the central system and the various appliances has hindered adoption of such systems.

SUMMARY OF THE INVENTION

The present invention addresses these needs.

One aspect of the present invention incorporates the realization that a communication technique known as "spread-spectrum" radio communication can be employed to provide economical, reliable, and versatile wireless remote control of electrical power supply or appliance operation. The term "spread-spectrum" refers to communication systems and techniques in which a carrier signal such as a radio frequency signal has information impressed upon it so that the carrier signal occupies a bandwidth wider than required for transmission of the information itself. Thus the carrier signal, and hence the information, is spread over a wide range of frequencies. According to well-known communication system theory, a spread signal is less susceptible to interference than an unspread signal. Simple forms of spread spectrum communications techniques, such as a common FM radio broadcasting, completely occupy relatively broad regions of the frequency spectrum. These techniques are unsuitable for use in remote control systems, inasmuch as the power levels of the transmitters would necessarily be limited to avoid interference with other users of the frequency spectrum, and there would be a considerable possibility for interference between neighboring systems.

In more sophisticated forms of spread-spectrum communication, the signal is spread by impressing both the information to be carried and a code on the carrier. In a "frequency hopping" scheme, the code is a sequence of discrete frequencies, and the code is impressed upon the carrier signal by switching the carrier signal among the various frequencies according to the coding scheme. In so-called direct sequence coding, the code is impressed upon the carrier signal to vary the carrier signal along with the transmitted information so that both the code and the information cause a particular parameter of the carrier to vary. For example, in a direct sequence scheme using frequency modulation, both the code and the transmitted information are applied to modulate the frequency of the carrier signal such as a radio signal. Thus, the code and information can be combined to produce an encoded information signal and that encoded signal can be impressed on the carrier. Similar direct sequence schemes can be used with other parameters of the transmitted carrier as, for example, in phase modulation, binary phase shift keying, amplitude modulation, frequency shift keying or even simple on/off keying. As used herein, the term "spread-spectrum" refers to techniques where a specific spreading code is impressed upon the carrier signal, and hence includes both direct sequence coding and frequency hopping. Also, the term "modulation parameter" is used broadly herein to refer to the parameter of the carrier signal which is varied in accordance with information and/or code, regardless of whether the particular scheme of variation involves modulation or keying. For example, in both frequency shift keying and frequency modulation, frequency constitutes the modulation parameter.

The receiver in a spread spectrum system decodes the signal and hence reverses the coding operation applied at the transmitter. Where the receiver is arranged to apply a specific decoding scheme, it will be relatively insensitive to signals encoded according to another scheme, even though those signals are transmitted over the same range of frequencies. Accordingly, many spread spectrum systems can occupy the same region of the electromagnetic spectrum without interfering with one another. Stated another way, a single spread spectrum system may occupy various frequencies within a relatively broad range of frequencies, but will not occupy any one frequency for a sufficient period of time to create a serious interference problem.

Spread spectrum systems heretofore have been regarded as suitable only for relatively sophisticated, high cost applications such as military systems, spacecraft communications and the like. According to the present invention, however, it has been found that spread spectrum techniques can be applied to provide a simple and economical system which meets the needs described above for electric power wiring and appliance controls. A system according to this aspect of the present invention may include a control transmitter unit including transmitter address storage means for storing a predetermined transmitter address or accepting a transmitter address from an external source such as a home automation computer, selectively operable trigger means for generating an action signal, and broadcast means for producing a spread spectrum radio signal carrying digital address information representing the transmitter address and digital command information representing the action signal. The radio signal is propagated through free space within the building. The transmitter unit may take the place of an ordinary wall switch or the like. The system preferably also includes a receiver incorporated in the building power supply wiring or, for appliance control applications, within the power supply wiring of a domestic appliance or the like. The receiver most preferably includes recovery means for receiving the spread spectrum radio signal propagated through free space from the transmitter unit and recovering the address and command from that radio signal. As will be appreciated, the receiver must be capable of decoding the information as encoded by the transmitter unit.

The receiver preferably also includes address storage means for storing a preset receiver address and address comparison means for comparing this preset receiver address with the transmitted address, as recovered by the recovery means. Control signal means are also provided for generating a control signal in response to the transmitted command, but only when the transmitted address matches the preset address stored by the receiver. Preferably, the receiver also includes action means for controlling transmission of electricity through the wiring of the building or appliance in response to the control signal.

This aspect of the present invention incorporates the realization that spread spectrum transmission can overcome the serious difficulties associated with reception of radio signals within buildings, and particularly within enclosures such as the junction boxes of building wiring systems or appliance enclosures. These enclosures typically are substantially closed metallic boxes having small openings at random locations on their surfaces as, for example, the small cracks left around conduit entries to junction boxes, mounting holes or the like. Such boxes, therefore, tend to attenuate radio signals and prevent them from reaching the interior of the box.

Moreover, whatever radio signals do propagate into the inside of the box ordinarily enter through multiple pathways. These factors, together with the additional attenuation and multipath effects created by walls and other building structural elements intervening between the transmitter unit and the receiver typically make it impractical to receive radio signals within such enclosures.

Because spread spectrum signals typically do not interfere with other signals occupying the same frequencies, governmental authorities will permit the use of greater power in spread spectrum signals. Therefore, the system can overcome the attenuation and provide a reasonable signal level within the enclosure. Moreover, the spread spectrum signal is substantially immune to multipath interference. Thus, the system can provide reliable performance even where the entire receiver is disposed within an enclosure. For example, a receiver for controlling a ceiling lamp may be mounted entirely within the junction box utilized to mount and connect the lamp. The transmitter unit may be mounted anywhere within range. In systems for controlling distribution of electrical power within a building, the transmitter unit is preferably isolated from the building wiring system and incorporates a battery power supply.

As will be appreciated, all of these factors greatly simplify installation of the system. The system according to this aspect of the present invention thus provides the long wanted solution to the remote control problems mentioned above. Plural transmitter units and plural receivers may be provided in a single system. These transmitter units and receivers are associated with one another by means of the addresses which they store or accept. Thus, one or several transmitters may be provided with the address of a single receiver. Any one of these transmitters can actuate the receiver and hence can control the associated electrical device. Conversely, several receivers can be provided with the same address so that all will be actuated by the same transmitter or transmitters.

The reliability of the system is greatly enhanced by providing error detecting features in the receiver. Thus, the receiver preferably includes means for recovering the digital information from the transmitted signal in encoded form and decoding the encoded digital information to provide the transmitted address and command. The receiver preferably also includes error detection means for comparing the encoded digital information with predetermined spreading code information and accepting the encoded digital information only if it matches the spreading code information within predetermined tolerances. The control signal means preferably is arranged to generate the control signal only if the encoded digital information is accepted by the error detection means. Thus, received signals must pass twofold tests within the controlled switch. The probability of an interference signal having both the proper code and also carrying the address of a given receiver is extraordinarily low, and hence the system is essentially immune to unwanted actuations caused by interfering signals.

In a particularly preferred arrangement, the transmitted signal includes a preamble signal and another portion carrying the actual message to be conveyed. Thus the signal may carry a digital message including both "preamble" and "information" bits. The information bits typically include bits representative of the address and command. Different codes may be employed with respect to the preamble bits and the information bits. The term "chip" as used herein refers to a bit which is part of a larger sequence representing a bit of encoded information, such as a sequence of 1 and 0 value chips representing a single 1 or 0 valued bit. Each preamble bit may be encoded into a preamble chip sequence according to a preamble code, and each information bit may be encoded into information chip sequences according to an information code different from the preamble code. A predetermined valuation parameter of a carrier signal such as a radio signal is varied in accordance with the chip values. The information chip sequences typically follow the preamble chip sequences in the message sent by the transmitter unit.

The receiver preferably includes means for recovering from the transmitted signal an output stream including the information chip sequences and also including output representative of the preamble. Decoding means preferably are provided for emitting information bit value signals only in response to the information chip sequences. The decoding means may be coupled to the recovery means so that the decoding means receives the entire output stream. However, because the decoding means is responsive only to the information chip sequences, the decoding means will not emit bit value signals in response to the initial portion of the output stream, representing the preamble. Rather, the decoding means will emit an initial bit value signal only when the first information chip sequence passes from the recovery means. The receiver preferably also includes bit level synchronization means for initializing a bit sequence index in response to this initial information bit value signal and means such as a clock for incrementing the bit sequence index in synchronization with subsequent information bit value signals. Thus, the receiver uses the difference in coding between the preamble and information bits to establish the location of the information bits within the transmitted signal and, having found that location, keeps track of the location of each information bit within the signal. Therefore, the receiver can interpret each information bit according to its intended meaning, i.e., either as part of an address or as part of a command.

Preferably the recovery means of the receiver includes detector means for providing a detector signal representing the modulation parameter in the radio signal, reference value means for providing a reference value, clock means for timing a decoding sequence of predetermined chip intervals and chip level comparison means for comparing the value of the detector signal during each chip interval with the reference value. The comparison means thus forms a sequence of 1 and 0 chips by assigning a 1 or 0 value to each chip interval depending on whether the value of the detector signal during the chip interval is greater than or less than the reference value. For example, in a system using frequency modulation, the detector may provide a voltage representing the received signal frequency, and the reference value may be a voltage corresponding to the central or carrier frequency of the frequency modulated signal. If the detector output voltage and hence the radio signal frequency is above the center frequency during a chip interval, the chip is assigned a value of one whereas if the receive frequency is below the center or carrier frequency, the chip is assigned the value zero.

Inaccuracy or "drift" in the transmitter or the receiver may cause confusion between 1 and 0 values. Thus, drift in the transmitter may cause the central frequency to rise above the intended center frequency, so that all of the signal consists of frequencies greater than the intended center frequency. In this case, the receiver will tend to interpret the signal as an uninterrupted stream of 1's, and the message will be lost.

In one preferred system according to the present invention, this problem is obviated by setting the reference value during transmission of the preamble bits. Thus, the receiver is provided with means for determining the mean value of the detector signal during transmission of the preamble bits and adjusting means for adjusting the reference value means substantially to the mean value of the detector signal. Lock means are provided for disabling the adjusting means after this adjustment has been made. Thus, the reference value of the receiver can be set to correspond with the actual characteristics of the radio signal as transmitted by the transmitter. The preamble bits preferably are encoded so that they are "DC free", i.e., so that they include equal numbers of 1 value and 0 value portions. Therefore, the predetermined modulation parameter of the transmitted signal will be above and below its central or threshold level for equal amounts of time during transmission of the preamble bits. The time-average value of the modulation parameter, and the time-average value of the detector signal will accurately represent the central value in the transmitted signal. As the reference value is set from the preamble bits, there is no need for the information bits to be DC free. Therefore, the information code can be one where the chip sequence representing a given bit value has an unequal number of one and zero chip values.

For the comparison means of the receiver to recover meaningful digital information from the signals, the decoding sequence of chip intervals must be synchronized with the chip intervals used by the transmitter. Preferably, the preamble signal is employed to establish this synchronization. In the most preferred synchronization scheme, a transmitted clock signal having alternating high and low periods each one half of the duration of one of the chip intervals used in the chip sequences. These half chip intervals are referred to herein as "crumb intervals." Preferably, the clock signal is combined at the transmitter with preamble chip sequences by a particular combination scheme referred to as "Manchester encoding." In this combination scheme, the two crumb intervals within each chip interval will always have different binary values, and hence the parameter of the transmitted signal will differ from one crumb interval to another within each chip interval. The receiver includes clock synchronization means which generates several, typically four, separate series of chip intervals so that each series of chip intervals is offset in time from the next series, preferably by an offset interval equal to one fourth of the duration of a chip interval. The clock synchronization means also includes means for subdividing each chip interval in each of these four separate series into equal crumb intervals. Crumb level comparison means are provided for determining whether each of the separate series of chip intervals satisfies the condition that the value of the detector signal, and hence the average value of the parameter in the transmitted signal, differ from one another for the two crumb intervals in each chip interval. A series of chip intervals which meets this condition is in synchronization with the chip intervals of the transmitted signal. That series is selected and used as the sequence of chip intervals for decoding subsequent portions of the signal. Stated another way, the clock synchronization means in the receiver tries several different series of chip intervals, and uses the Manchester-encoded transmitted clock signal and preamble bits to check the synchronization of each series.

This particularly preferred synchronization scheme is a special case of a more general scheme which can be used according to this aspect of the invention. In the general scheme, the transmitter includes means for generating a clock signal having discrete values for different crumb intervals, each crumb interval being a fraction of the chip interval, and means for combining this clock signal with the preamble chips so that a predetermined sequence of discrete clock signal values is impressed on the transmitted signal during each chip interval. The receiver includes means for generating plural separate series of chip intervals each offset from the others, subdividing the chip intervals of each said separate series into crumb intervals and performing a matching test on the detector signal for the crumb intervals of each chip interval in each separate series against a template corresponding to the predetermined sequence of clock signal values used by the transmitter. The receiver selects the particular series for which the detector signal best matches the template and uses the so-selected sequence of chip intervals for decoding the remainder of the signal. Desirably, a small even number of crumb intervals are included in each chip interval.

Yet another aspect of the present invention relates to specific features of the decoding apparatus which can be used, for example, as the decoder means of a receiver in the aforementioned systems. The decoder receives an input stream of digital data chips. As received by the decoder, each chip originally has either a first or second binary value, i.e., 1 or 0. A predetermined sequence of chips, N-chips long denotes a valid first bit value, as, for example, a binary 1 bit. The decoder preferably includes transform means selecting successive N-chip sequences from the input data stream and transforming the original values of each chip in each selected N-chip sequence into either a first analog output or a second analog output such that when a sequence includes the series of first and second binary values indicating a valid first bit, every one of the analog values will be equal to the first analog value. Thus, two different transformation schemes may be applied to the original chip values in each selected sequence. According to a first or "noninversion" transformation scheme, an original chip value equal to the first binary value will yield the first analog output whereas an original chip value equal to the second binary value will yield the second analog output. According to the second or "inversion" transformation scheme, the reverse correlation applies. A chip value equal to the first binary value yields the second analog output, and vice-versa. These two different transformation schemes are applied to the chips in each selected N-chip sequence according to the positions of the chips in the sequence. The first or noninversion transformation is applied to chips in positions within the selected sequence corresponding to the positions of first-value chips in the predetermined sequence denoting a valid first bit value. The second transformation is applied to chips occupying positions in the selected N-chip sequence corresponding to the positions occupied by second-value chips in the same predetermined sequence denoting a valid first bit value.

Merging means are provided for merging all of the analog outputs from the transform means to form a composite analog output. Where a valid first bit value sequence is selected, all of the analog outputs will be equal to the first analog value and hence the composite analog output will be equal to a standard value corresponding to merger of N analog output signals each equal to the first analog value. If any other sequence of chips is selected, at least some of the analog outputs will be equal to the second analog value rather than the first. Therefore, the composite analog output will be something different from the standard value. First analog test means, such as a comparator, are provided for determining whether the composite analog output is equal to the first standard value, and emitting a first bit value signal only when this equality occurs. Most preferably, the decoder also includes second analog test means for determining whether the composite analog output is equal to a second standard value corresponding to the composite analog output produced when all of the analog signals are equal to the second analog value, and emitting a second bit value when this equality occurs. As will be appreciated, the second analog test means will emit the second bit value signal when a sequence of N chips having individual chip values inverse to the chip values of the first sequence is selected by transform means. Thus, the decoder will recognize one sequence of chip values as indicating a first bit value and recognize the inverse sequence as indicating a second bit value.

Means such as a shift register may define a sequence of N positions including "non-inversion" and "inversion" positions arranged so that the locations of non-inversion positions in the sequence of register positions corresponds to the locations of chips having the first binary value within the sequence of N-chips denoting the first bit value. Conversely, the locations of the inversion positions within the sequence of positions in the shift register corresponds to the locations occupied by chips having the second binary value in the sequence of chips denoting the first bit value. The digital transform means may be arranged to align each selected N-chips sequence in the N-position sequence of the shift register and to provide a binary position output for each non-inversion position equal to the original value of the chip aligned in that position. The digital transform means also provides a binary position output for each inversion position in the register which is inverse to the original value of the chip aligned in that position. As will be appreciated, when a valid first bit sequence is aligned in the sequence of register positions, the position outputs will all be equal to the first binary value.

The transform means according to this aspect of the present invention most preferably also includes analog output means for providing an analog position output for each of the positions in the register such that each analog position output is substantially equal to the first analog value when the binary position output for the associated position is equal to the first binary value and so that the analog position output is substantially equal to a different, second analog value when the binary position output for the position is equal to the second binary value.

The analog features of the decoder according to this aspect of the present invention accomplish a chip sequence testing function which otherwise would require a great number of digital components. Moreover, the analog devices utilized in preferred forms of this decoder are well suited to integrated circuit fabrication techniques. Particularly, the analog devices may include a set of resistors all formed as elements of a single integrated circuit which preferably also includes the digital components of the decoder, such as the shift register. Moreover, the analog test arrangement makes it easy to provide a tolerance in the system. Thus, by adjusting the standard values applied by the analog comparison means, the decoder can be set either to accept only perfect chip sequences or to accept chip sequences with up to any selected number of incorrect chip values.

Yet another aspect of the present invention provides alternative designs for the transmitting and receiving systems, and for the communications methods employed in the remote control system. According to this further aspect of the invention, the information bits in the signal, including the address and command bits, may be encoded in a DC-free code. Thus, each bit value preferably is encoded into a plurality of chip values including substantially equal numbers of zero and one chip values. The encoded message is transmitted on a carrier signal such as a radio frequency signal by varying the modulation parameter of the signal. The receiver is preferably provided with detector means for producing a detector signal representing the predetermined parameter of the signal as, for example, a detector signal representing frequency in a frequency modulated signal. Reference value means are provided for determining the time average value of the detector signal, and the chip values preferably are recovered by chip level comparison means which compare the detector signal as received with the time average value and assign either a one or a zero value to a chip according to whether the detector signal is greater or less than the time average value. This chip level comparison means provides a string of binary data chips with zero or one values representing the encoded message. Decoding means are provided for decoding the data chips to thereby recover the message.

Because each bit in the message is encoded into a group of chips including substantially equal numbers of zero and one values, the time average value of the detector signal necessarily will be intermediate between the values of the detector signals associated with a one chip value or a zero chip value. Therefore, the time average value of the detector signal can be used as a standard for determining whether the instantaneous value of the detector signal at any given time represents a one or a zero value. Thus, the receiver can automatically compensate for drift either in the transmitter or the receiver as, for example, where the central frequency of an FM transmitter drifts with time, or the response characteristics of the FM detector change slowly with time. Stated another way, the transmitted signal carrying the information bits (the address bits and command bits) encoded by this DC-free coding scheme carries its own internal standard—the time average of the predetermined parameter which is varied to carry the chip values.

Preferred systems according to this aspect of the present invention utilize a further measure to counteract undesirable confusion between a signal and the same signal together with some random or spurious chips. For example, in a coding scheme where the binary bit value one is encoded into chips values 1010, whereas the bit value zero is encoded into the chip values 0101, a sequence of three bits, each having bit value one would be encoded as:

101010101010 whereas a message of three 0-value bits would be encoded as:

010101010101

If the receiver receives a message containing one spurious chip value (as from interference or noise) as follows:

101010101010 it is impossible to tell whether the first or the last "1" is spurious, and impossible to tell whether the message is three 1's or three 0's. A coding scheme prone to confusion upon shifting of the encoded signal, as by spurious additions or deletions can be said to have significant "autocorrelation sidelobes" With a coding scheme having significant autocorrelation sidelobes, a message with one content can be falsely read as a message with different content merely by adding one or deleting a few chips or bits of erroneous information so as to shift the message.

According to this aspect of the present invention, this problem in encoding schemes such as DC-free encoding schemes is solved by using two or more different encoding schemes for different bits in the same message. Thus, the transmitter desirably includes encoding means for encoding the value of each bit in the message according to one of plural different encoding schemes according to the position of the bit in the message so that the order in which the different codes are applied corresponds to a predetermined "overlay code" For example, the encoding means in the transmitter may be arranged to encode each bit either to an A-encoding scheme or a B-encoding scheme, where these two encoding schemes are different from one another. The receiver is arranged to apply the different decoding schemes to different groups of chips representing bits in the message so that these different decoding schemes are applied in the same way as the encoding scheme was applied by the transmitter. Thus, in the system employing A and B encoding schemes in the transmitter, A and B decoding schemes are used in the receiver. The A decoding scheme is inverse to the A encoding scheme, whereas the B decoding scheme is inverse to the B encoding scheme. The receiver assigns groups of chips corresponding to the various bits in the message either for decoding by the A decoding or for decoding by the B decoding scheme according to the positions of the groups within the message such that the order of groups assigned for decoding according to these schemes also corresponds to the predetermined overlay code. Stated another way, the decoding means in the receiver applies the same decoding scheme to each group of chips as was used by the encoding means of the transmitter to create that particular group of chips.

The overlay code used to control the order in which the various encoding and decoding schemes are applied preferably is itself a code with low autocorrelation sidelobes. By using two or more encoding schemes to encode the individual bits into chips, together with the overlay code, the autocorrelation sidelobe problem is substantially eliminated even where the individual encoding schemes are encoding schemes with poor autocorrelation properties. Thus, many of the simplest DC-free encoding schemes have poor autocorrelation properties (significant autocorrelation sidelobes) when utilized by themselves. With the overlay encoding scheme according to this aspect of the present invention, these codes can be used to provide the valuable benefits of DC-free encoding while substantially avoiding the adverse effects of autocorrelation sidelobes.

The receiver utilized according to this aspect of the present invention most preferably includes a register defining a plurality of positions, typically equal the total number of chips in the entire message. The positions in the register are divided into "A blocks" and "B blocks" of positions, the number of positions in each such block corresponding to the number of chips used to represent a single bit. The order of the A blocks and the B blocks in the register corresponds to the order established by the overlay code. The interpretation means of the receiver also includes A-decoder means associated with each A block for decoding the chips positioned in the block according to the A-decoding scheme, and B-decoder means associated with each B block for decoding the chips positioned in the B block according to the B-decoding scheme. Thus, each of the A-decoders and B-decoders is associated with one block of register positions and hence with a predetermined bit position in the message. When the sequence of chips constituting the received message is aligned in the register, the appropriate blocks of chips are delivered to the appropriate decoders, and the message is recognized. The receiver may include reference information means for providing a sequence of reference bits corresponding to a sequence of bits in the message such that the value of each reference bit is equal to the expected value of the corresponding bit in the message. For example, the reference information means may provide a sequence of address bits denoting the preset receiver address. The receiver preferably includes means for comparing the value of each reference bit with the value of the corresponding bit in the received message.

In a preferred arrangement according to this aspect of the invention, the reference information means provides each of the decoder means with a reference bit value equal to the expected value for the associated bit position in the message. Each of the A-decoder means may be arranged to encode the reference bit value into reference chip values according to the A-encoding scheme, whereas each of the B-decoder means may be arranged to encode the reference bit value supplied to it into reference chip values according to the B-decoding scheme. Thus, each of the A-decoder and B-decoder means may include disparity check means for comparing the reference chip values with the chip values in the associated block of register positions. In this arrangement, the decoder means decodes the chip values by comparison with the reference chip values, and simultaneously compares the bit value represented by the chip values in the message with the reference bit value. Preferably, each of the A-decoder and B-decoder means includes bit-level disparity count means for providing a count of the disparities between the reference chip values and the message chip values compared in the decoder. The interpretation means preferably also includes disparity total means for adding the counts provided by bit level disparity count means and accepting or rejecting the message based upon the resulting sum.

Where the message includes an address and a command, some of the A-blocks and/or B-blocks of positions in the register may be designated as command blocks. These command blocks are located within the register at positions corresponding to the positions of command bits in the transmitted message. The reference information means may be arranged to provide two or more alternative sets of command bit values representing two or more alternative commands to the decoder means associated with the command blocks. The decoder means associated with each command block preferably includes means for encoding one bit value from each of the sets of command bit values into two sets of alternative chip values and comparing each said set of alternative chip values with the values of the message chips in the associated block of register positions. The decoder associated with each command block preferably provides a disparity count for each of these separate comparisons. The interpretation means preferably further includes command signal selection means for separately summing the disparity counts from comparisons for the various alternative commands and selecting the alternative command for which there are the fewest disparities.

These and other objects, features and advantages of the present invention will be more readily understood from the detailed description of the preferred embodiment set forth below, taken in conjunction with the accompanying drawings.

DETAILED DESCRIPTION OF THE PREFERRED EMBODIMENTS

Figure 1:
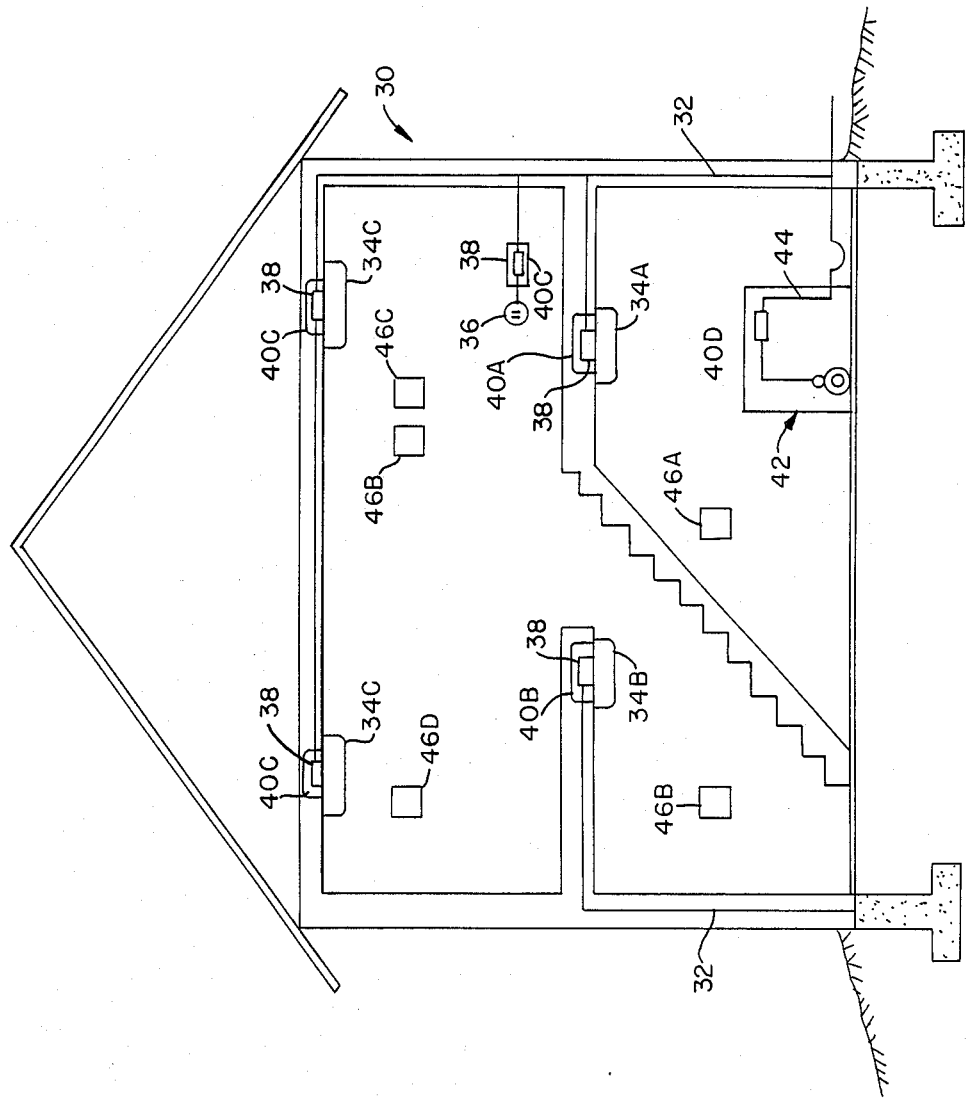
FIG. 1 is a schematic diagram of a building incorporating a wireless remote control system according to one embodiment of the present invention.

As shown in FIG. 1, a building 30 may incorporate conventional power supply wiring 32 extending through the walls and ceilings of the building to power consuming devices such as conventional ceiling lamps 34 and outlets 36. The wiring 32 joins each of the power consuming devices at a junction box 38, which box is also employed to mount the power consuming device to the structure of the building. A receiver 40 is mounted within each junction box 38 so as to control the associated power consuming device 34 or 36. As further explained hereinbelow, each receiver 38 is arranged to connect the power consuming device to the supply wiring 32 or disconnect it therefrom, so as to control operation of the power consuming device. Also, an electrical appliance 42 is disposed inside the building, the internal wiring system 44 of the appliance being connected to the power supply wiring 32 of the building. A further receiver 40 is mounted within the housing of appliance 42, so as to connect or disconnect components of the appliance from one another, as, for example, to control power to a motor within the appliance.

A plurality of transmitters 46 are provided at various locations within the building. As shown in FIG. 1, none of the transmitters 46 is physically connected to the power supply wiring, to the power consuming devices or to the appliance. Each transmitter 46 is utilized to control one or more of the receivers and hence to control the associated device or appliance. Thus, transmitter 46A controls ceiling lamp 34A by controlling receiver 40A, whereas each of transmitters 46B control receiver 40B and hence control stairway lamp 34B. Conversely, the single transmitter 46C controls all of receivers 40C and hence controls both ceiling lamps 34C and power outlet 36. Transmitter 46D controls receiver 40D and hence appliance 42. The physical locations of the transmitters are selected solely for convenience of the user. As there is no physical connection between the transmitters and receivers, and as the transmitter radio signal can pass through walls and floors, the transmitters can be mounted anywhere within the building. To assure that only the proper devices or appliances are actuated upon operation of a transmitter, the transmitters and receivers are provided with addresses. Thus, transmitter 46A has a transmitter address corresponding to the receiver address of receiver 40A, each of transmitters 46B has a transmitter address corresponding to the receiver address of receiver 40B and so on. As further explained hereinbelow, the receiver checks incoming signals or the correct address and acts to connect or disconnect the power consuming device or appliance only if the transmitter address, as carried by the incoming signal, matches the receiver address. For example, receiver 40B will be insensitive to on/off signals from transmitter 46A.

A transmitter 46 (FIG. 2) includes a housing 48 adapted for mounting to the walls of the building. Housing 48 may be dimensioned to fit within a standard junction box, and may, if desired, be provided with mounting elements 50 dimensioned to fit the mounting holes and the like commonly provided in standard junction boxes. This facilitates installation of the transmitter in place of existing conventional wall switches. However, because the transmitter does not carry any line voltage, it is unnecessary to install the transmitter within a junction box.

A battery 52, which may be a conventional battery of the type used in watches or hearing aids, is mounted within the housing together with the other elements of the transmitter. These elements include a trigger 54 having a pair of manually actuatable buttons 56 and 58 projecting from the housing, and a clock and control unit 60. Trigger mechanism 54 includes momentary switches (not shown) linked to buttons 56 and 58. When neither of these buttons is depressed, the transmitter is quiescent and battery 52 is disconnected. When either button is depressed, the trigger unit momentarily connects the clock and control unit to the battery. As the clock and control unit receives power from the battery, it latches closed a connection 64 which remains closed until the clock and control unit produces a disconnect signal, as further described hereinbelow. The clock and control unit thus directs power to all of the other elements of the transmitter. When button 56 is depressed, trigger unit 54 delivers a signal representing a "on" command to a command unit 62, whereas when button 58 is depressed the trigger unit delivers a signal representing a "off" command to this command unit. The command unit stores this information momentarily.

The clock and control unit 60 marks out 32 discrete bit intervals. During the first or "0" bit interval, a carrier signal generator 66 is started and provides a radio frequency carrier signal, typically at about 915 Mhz. During the following bit intervals, the clock and control unit 60 instructs a preamble bit generator 65 to generate two arbitrary preamble bit value signals. A preamble coding unit 68 converts or encodes each of the bit value signals received from preamble bit generator 65 into a sequence of 31 chips, according to a predetermined preamble chipping code. Clock and control unit 60 continually times out a series of predetermined chip intervals, typically about 1 microsecond each. Each chip value of the encoded preamble is output by preamble coding unit 68 as a high or low value of a signal for one chip interval.

Figure 3:
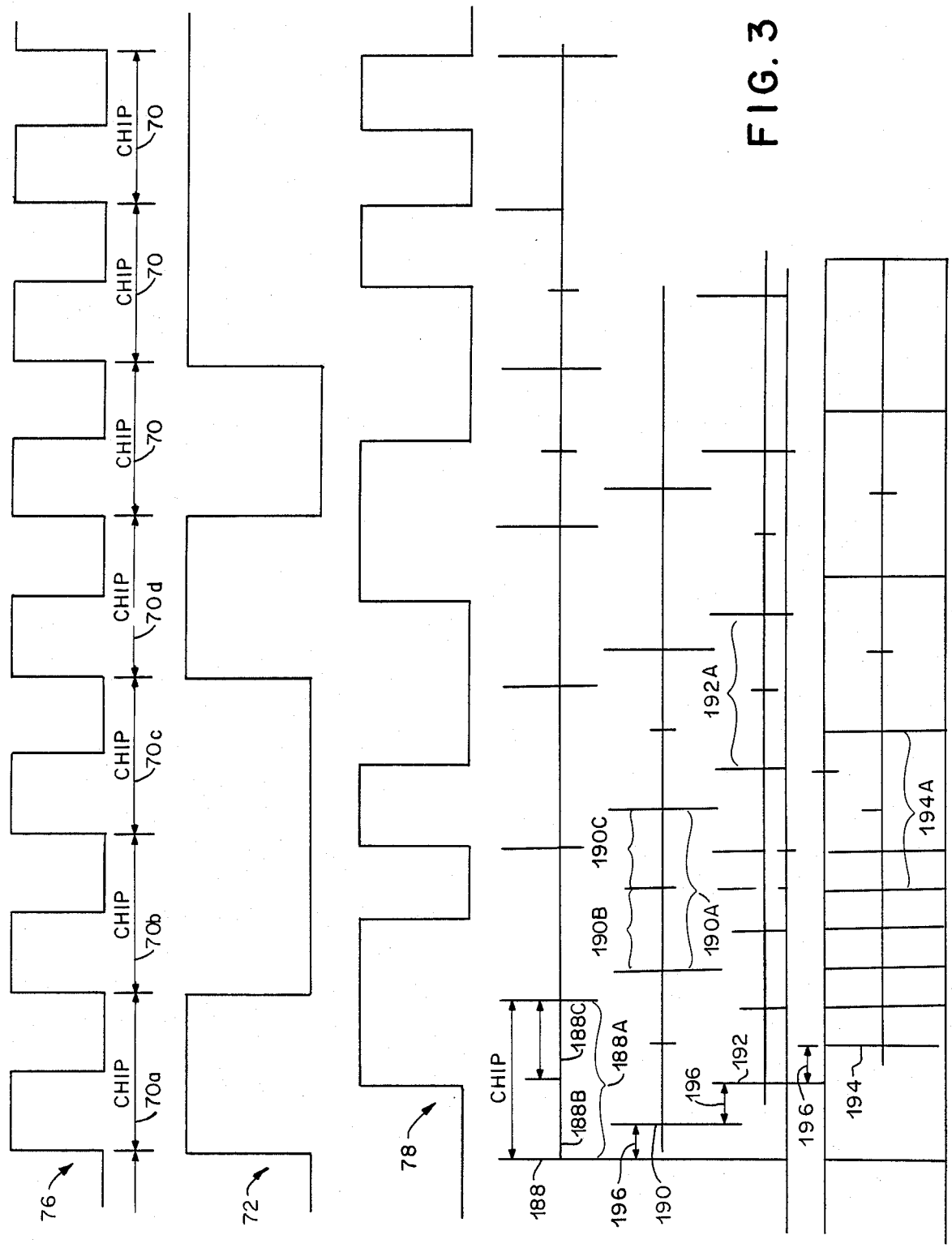
FIG. 3 is a plot of certain signals employed in the system of FIG. 1.

A series of these chip intervals 70 are illustrated in FIG. 3, together with the signal 72 carrying the chip values. This signal has a high value for chip interval 70A, a low value for chip interval 70B, low again for chip interval 70C and high again for interval 70D and so on, thus carrying the binary chip value sequence . . . 1001 . . . . The signal bearing the encoded chip values is delivered by preamble coding unit 68 to Manchester encoding unit 74. Clock and control unit 60 generates a transmitter clock signal 76 (FIG. 3) having alternating high and low values, the clock signal being synchronized with the chip intervals so that the clock signal has a high value for a "crumb interval" equal to one-half of each chip interval and a low value for a "crumb interval" equal to the other half of each chip interval. Manchester encoding unit 74 combines the transmitter clock signal 76 with the preamble chip value signal 72 under an exclusive or combination scheme. That is, the output signal 78 of the Manchester unit 74 is low when the transmitter clock signal 76 and the preamble chip value signal 72 have the same value, whereas the Manchester output signal 78 is high when the preamble chip value signal 72 and transmitter clock signal 76 have different values. For example, at the beginning of chip interval 70A, both the preamble chip signal 72 and the transmitter clock signal 76 are high, so that the Manchester signal 78 is low. Midway through chip interval 70A, the clock signal 76 goes low, so that it is different from the chip value signal 72, and the Manchester output signal 78 accordingly goes high. At the end of the chip interval 70A, the chip value signal 72 goes low, whereas the clock signal goes high, so that there is still a difference between signal 72 and 78. Thus, Manchester encoded signal 78 remains high. As will be seen from inspection of the portions of the signals illustrated, the chip value signal necessarily remains the same throughout each chip interval, whereas the transmitter clock signal always changes from high to low at the middle of each chip interval. Accordingly, there will always be a transition at the middle of each chip interval. Depending upon the value of the chip value signal 72, that transition may be from low to high or from high to low, but there will necessarily be a transition of some sort at the middle of each chip interval. Conversely, there may not be a transition at the end or at the beginning of a chip interval. As will also be appreciated from inspection of FIG. 3, Manchester signal 78 is DC-free. That is, it is high and low for substantially equal amounts of time. These properties of a Manchester encoded signal hold true regardless of the content of the signal, i.e., regardless of the chip values in chip value signal 72.

Figure 2:
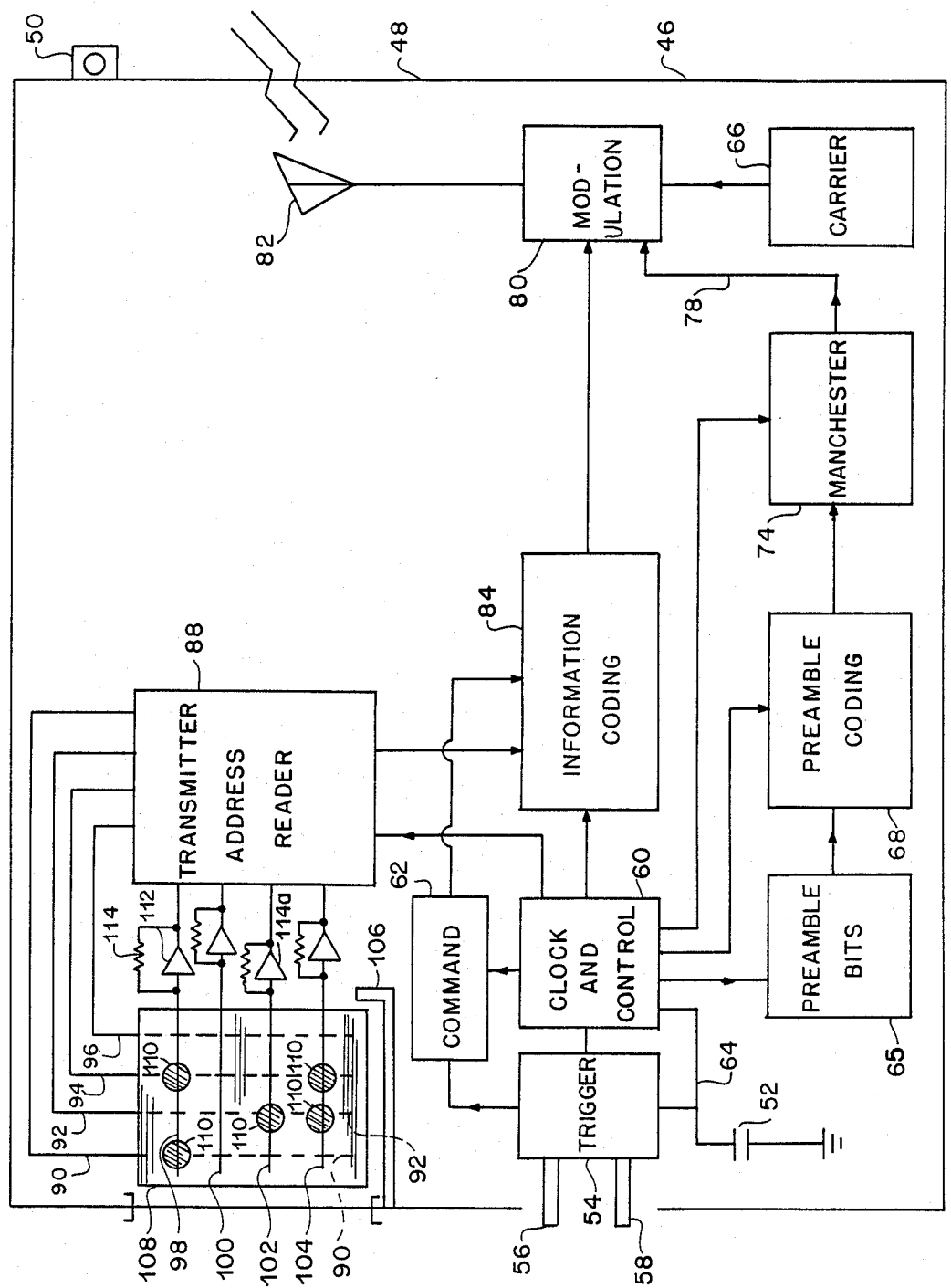
FIG. 2 is a functional block diagram of a transmitter utilized in the system of FIG. 1.

Manchester encoded signal 78 is delivered to modulation unit 80 (FIG. 2). Modulation unit 80 varies a predetermined parameter of the carrier signal from carrier signal generator 66 in accordance with the signals which it receives. In this case, the modulation unit is arranged to vary the frequency of the carrier signal according to well-known principles of frequency modulation. Thus, the frequency of the carrier is slewed back and forth between a high value, above its center frequency of 915 Mhz and a low value below the center frequency of 915 Mhz in accordance with the high and low values of Manchester encoded signal 78. The frequency modulated radio signal is propagated from an antenna 82 within housing 48 so that the frequency modulated signal passes into free space within the building.

After the preamble bits, clock and control unit 60 produces a synchronization bit value 1 which is passed to information coding unit 84. Information coding unit 84 is arranged to encode any bit value which it receives according to a predetermined information chipping code wherein the bit value 1 is expanded into a sequence of 15 chip values:

---
1 (leading chip),1,0,1,0,0,0,1,1,0,1,0,0,1,1, (trailing chip)
---

Whereas the bit value 0 is indicated by the opposite or inverted series of chip values, i.e., 0 (leading) 01011100101100 (trailing). The information coding unit 84 may include a memory storing the chip values for the bit-value-1 sequence, means for reading these values out of the memory in order, an inverter and means for enabling the inverter to invert the chip values if the bit value is 0. The information coding unit 84, like the preamble coding unit 68, impresses the chip values on a chip value signal so that the chip value signal goes high or low for the entirety of one of the chip intervals 70 (FIG. 3) timed out by the clock and control unit depending upon the binary value of each chip. Thus, information coding unit 84 produces a chip value signal representing the synchronization bit consisting of 15 chip intervals with the appropriate high and low values. This signal, like the preamble chip value signal, varies as shown by curve 72 (FIG. 3). The information chip value signal is passed directly to modulation unit 80. The clock and control unit times the generation of the synchronization bit and the operation of the information coding unit 84 so that the synchronization chip value signals representative of a synchronization bit pass into the modulation unit immediately following the Manchester signal representative of the preamble bits. Modulation unit 80 impresses the information chip value signal on the carrier signal in substantially the same way as described above, causing the frequency of the signal to vary in accordance with the high and low chip values, and hence to vary as shown by curve 72 (FIG. 3).

The clock and control unit 60 also actuates transmitter address reader 88. Transmitter address reader 88 includes a set of four interrogation conductors 90, 92, 94 and 96 and four response conductors 98, 100, 102, 104 extending transverse to the interrogation conductors. The response conductors 98–104 lie in a common plane, whereas the interrogation conductors 90–96 lie in a different common plane parallel to and adjacent the plane of the response conductors. The interrogation and response conductors thus cross one another but do not make contact with one another. A card holder 106 is arranged to releasably hold a card 108 so that the card is positioned between the planes of the interrogation and response conductors.

The interrogation and response conductors define an array of 16 sensing locations. One interrogation conductor is juxtaposed with one response conductor at each such sensing location. Thus, the crossing of interrogation conductor 90 and response conductor 98 defines a first sensing location, the crossing of interrogation conductor 92 with response conductor 98 defines the second sensing location and so on. Card 108 has metallic conductive elements 110 at positions on the card corresponding to the sensing locations. The conductive elements 110 are positioned such that when the card is engaged in card holder 106, the conductive elements will be positioned at the sensing locations. As seen in FIG. 2, these conductive elements 110 are present at some sensing locations but absent at others. The presence or absence of the information bearing elements at the locations on the card portrays a 16 bit address. Thus, the particular card 108 illustrated in FIG. 2 has conductive elements 110 only at the first, third, tenth, fourteenth and fifteenth sensing locations in the 16 position array, viz, at the positions corresponding to conductor crossings 90/98; 94/98; 92/102; 92/104; and 94/104.

Clock and control unit 60 delivers a series of 16 query signals to the transmitter address reader 88. In response to each query, the transmitter address reader checks for presence or absence of a conductive element 110 at one of the sensing locations, using a new sensing location on each query so that the sensing locations are examined in order. For example, on the first query, the transmitter address reader energizes interrogation conductor 90 by switching this interrogation conductor from a rest voltage to an interrogation voltage different from the rest voltage. The reader tests for a significant current surge on response conductor 98 resulting from this switching. As there is a conductive element 110 present at this sensing location, the interrogation conductor 90 is strongly capacitively coupled to the response conductor 98, so that a strong surge is returned on response conductor 98. On the next query, the transmitter address reader energizes interrogation conductor 92 and again checks for a surge on response conductor 98. As there is no metallic element 110 present at the sensing location defined by interrogation conductor 92 and response conductor 98, there is only weak capacitive coupling between the conductors at this location, and only a feeble surge is returned on the response conductor. In this fashion, the transmitter address reader checks all of the sensing locations in sequence. The transmitter address reader outputs a one bit where there is a strong surge and a zero bit where only a feeble surge is returned. Thus, the transmitter address reader reads a 16 bit address from card 108.

Each of the response conductors 98-104 is provided with an inverting amplifier 112 and feedback resistor 114. The properties of these components are selected so that when a change in potential is applied to the response conductor, the inverse change will be applied back through feedback resistor 114, thereby maintaining the response conductor at substantially a constant voltage. The voltage output of the amplifier 112 is transmitted to the reader 88 at an output signal for the response conductor. This arrangement prevents spurious readings. For example, when the address reader transmits a pulse along interrogation conductor 94, and checks for a current surge on response conductor 102, the address reader 88 should see only a feeble return. If the voltages on the response conductors were allowed to "float", the pulse transmitted along interrogation conductor 94 could be transmitted strongly via element 110 at location 94/104 to conductor 104, along conductor 104, and coupled by another information bearing element 110 at location 92/104 onto interrogation conductor 92. This coupled pulse could then travel to the sensing location defined by conductors 92 and 102, where it would be strongly coupled back onto response conductor 102 via the further information bearing element 110 at that sensing location, leading to an erroneous strong surge on conductor 102. However, because the potential on each row conductor is maintained substantially constant by the inverting amplifier and feedback resistor, this spurious coupling does not occur.

Figure 14:
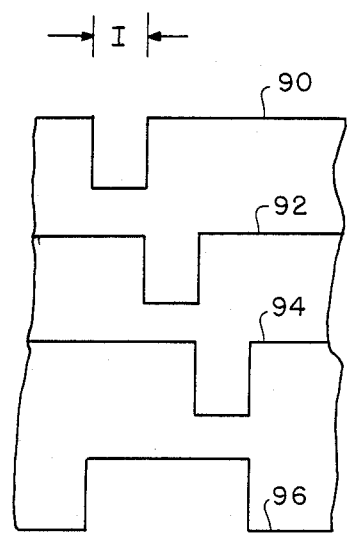
FIGS. 14 and 15 are plots of signals utilized in certain embodiments of the invention.

To simplify the task of discriminating between the strong surges denoting presence of a conductive element and weak surges resulting from incidental capacitive coupling at the sensing locations, the interrogation signal pattern shown in FIG. 14 is employed. The four curves shown in FIG. 14 represent the potentials applied to the four interrogation conductors 90-96 to interrogate the sensing locations associated with a given response conductor. While one response conductor is selected, interrogation conductor 90 is first switched from a rest or high potential to an interrogation or low potential. At substantially the same time, conductor 96, which had previously been at the low or interrogation potential, is switched back to the rest potential. At a new cycle time, after a predetermined interval I, conductor 92 is switched to the interrogation potential, and conductor 90 is switched back to the rest potential. On the next cycle time, after another interval I, conductor 92 is switched back to rest potential, and conductor 94 goes to interrogation potential. Thus, at each cycle time, one conductor goes to interrogation potential while another goes to rest potential at substantially the same time.

Figure 15:
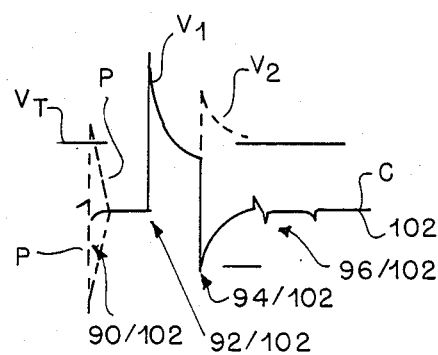

These opposed substantially simultaneous switchings tend to produce approximately equal but opposite current pulses on the response conductor where there is no conductive element at either of sensing locations involved. Accordingly, the output signal from the amplifier 114 associated with the response conductor will be negligible. FIG. 15 shows the pattern of output voltages from amplifier 114a associated with response conductor 104 during the interrogation process described above. As interrogation conductor 90 goes to interrogation potential to test sensing location 90/102 defined by conductors 90 and 102, and conductor 96 goes to rest potential, substantially equal but opposite current surges are produced at sensing locations 90/102 and 96/102. The forward surge at location 90/102 alone would cause amplifier 114a to emit a significant positive voltage pulse P, indicated in broken lines. The reverse current surge at location 96/102 would cause a negative voltage pulse P' from amplifier 114a. Because both current surges occur together, and both are approximately equal in magnitude, the actual voltage from amplifier 114a (solid line curve) does not change appreciably from its central value C. When conductor 92 goes to interrogation potential, it produces a substantial forward surge because there is a conductive element 110 (FIG. 2) at sensing location 92/102. This is counteracted only by the weak reverse surge produced at location 90/102. Thus, amplifier 114a yields a substantial positive voltage pulse $V_1$. As this major positive pulse exceeds a predetermined threshold value $V_t$, it is interpreted by reader 88 as indicating presence of an information bearing element.

The time constant of amplifier 114a is selected so that the voltage from the amplifier does not decay all the way back to its quiescent or central value C by the next cycle time. At this next cycle time, there is a significant reverse current surge as conductor 92 goes back to rest potential and only a small forward surge as conductor 94 goes to interrogation potential to test location 94/102. Thus the output of amplifier 114a goes negative. Such negative excursions are not sensed by reader 88. If there were an element 110 at location 94/102, there would be a major forward current surge and hence positive voltage surge $V_2$ (broken lines). Although the forward current surge would be counteracted by the reverse current surge caused by return of conductor 92 to its rest potential, the output voltage of amplifier 114a would nonetheless go above threshold value $V_T$ because of the positive voltage component left from the slow decay of pulse V. The same pattern of interrogation potentials (FIG. 14) is applied while each of the other response conductors is selected. Of course, the pattern of amplifier output voltages differs because the elements 110 are arrayed at different sensing locations along these other response conductors. As will be appreciated, this system enhances the signal-to-noise ratio of the response conductor output signals. For best results with this system, the interrogation and response conductor elements defining the sensing locations desirably have uniform geometry to provide substantially equal capacitive coupling properties at every sensing location. For example, the interrogation and response conductors may both be disposed on one surface of a printed circuit board, and the sensing locations may be defined by "pads" of conductive material on the board surface juxtaposed edgewise. These pads should have identical geometry.

As the transmitter address reader reads each bit of the address from card 108, the reader outputs an information bit to information coding unit 84. Each of these bits is encoded into the 15 chip code just as was the synchronization bit referred to above. Thus, where the address reader transmits a bit value of one, the information coding unit will encode the 1 bit value in the information chipping code as a sequence of high and low chip values, whereas a 0 address bit value is encoded as the opposite series of zero and one chip values. Again, the chip values are carried as high and low values of a chip value signal, with each chip value being carried for a full chip interval. The clock and control unit times operation of the transmitter address reader and the information coding unit 84 so that the chip value signals representing the 16 address bits are output by the information coding unit in sequence, immediately following the chip value signals representing the synchronization bit referred to above. The chip value signal carrying the encoded address bits is passed to the modulation unit 80, which impresses it upon the carrier in the same way as described above.

The clock and control unit 60 then queries command unit 62, and the command unit provides a command bit having value one if the signal originally received from a trigger unit 54 was a "on" signal and having value of zero if the command received from the trigger unit was a "off" signal. The command bit passes to the information coding unit 84, where it is also encoded according to the information chip code. The encoded command bit passes to modulation unit 80 immediately following the encoded address bits referred to above, and the chips representing the command bit are likewise impressed upon the carrier by modulation unit 80.

Although the operations described above have been described separately, it should be appreciated that the sequence of operations serves to broadcast a frequency modulated radio signal carrying the Manchester encoded chip sequences representing the preamble bits, followed by the chip sequences representing the synchronization bit, the 16 address bits, and the command bits in that order.

Following transmission of this signal, the clock and control unit temporarily interrupts output of the radio frequency signal, as by disabling carrier signal generator 66, for an interval equal to that required to transmit 11 further command bits, i.e., for an interval equal to 165 chip intervals. After this temporary interruption, the clock and control unit repeats the entire sequence of operations, thus retransmitting exactly the same signal. This process is repeated again, so that the signal is transmitted three times in all. Following the third transmission, the clock and control unit breaks the connection with battery 52, so that the transmitter returns to its quiescent state.

Figure 4:
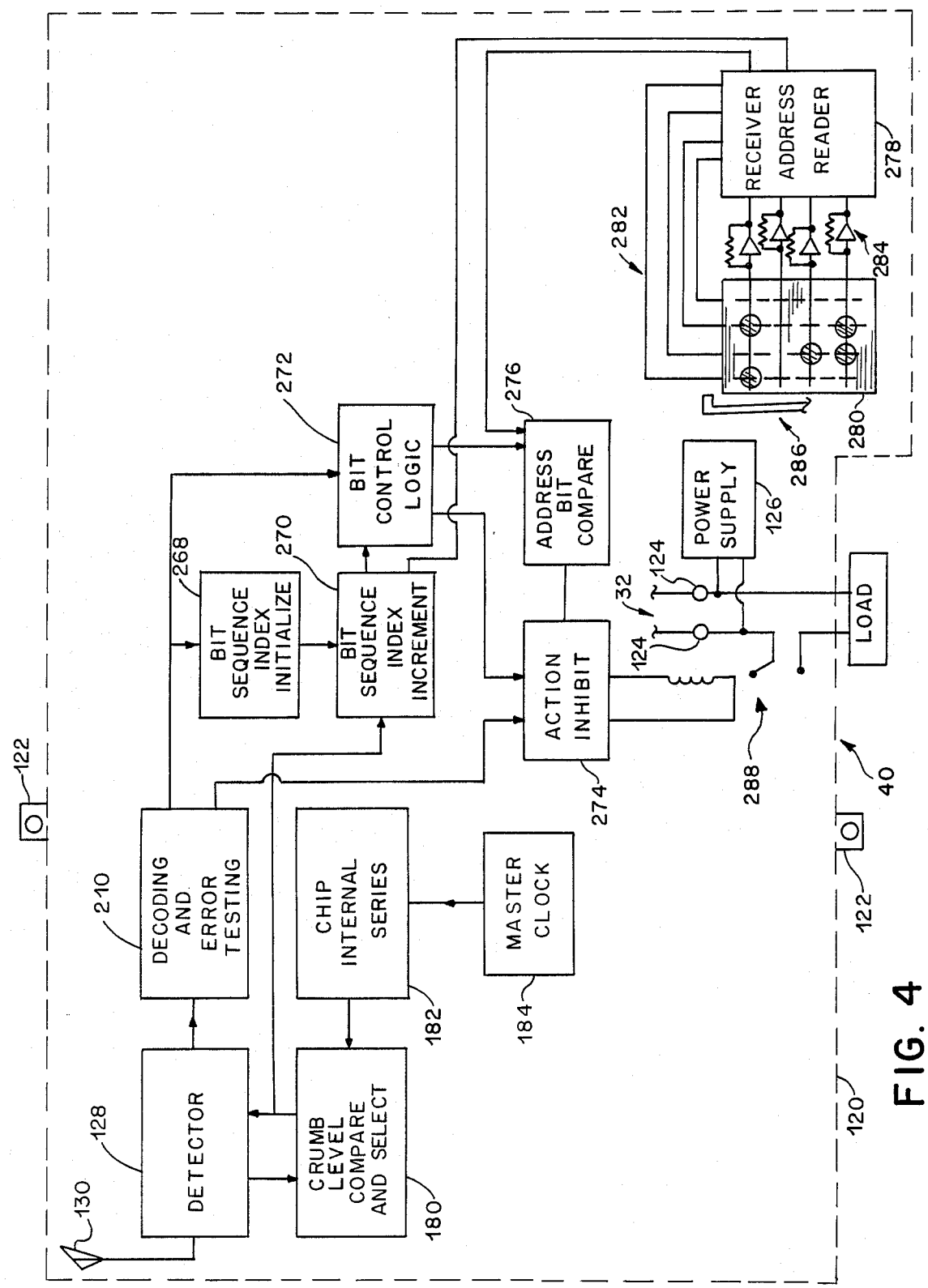
FIG. 4 is a block diagram of the receiver utilized in the system of FIG. 1.
Figure 5:
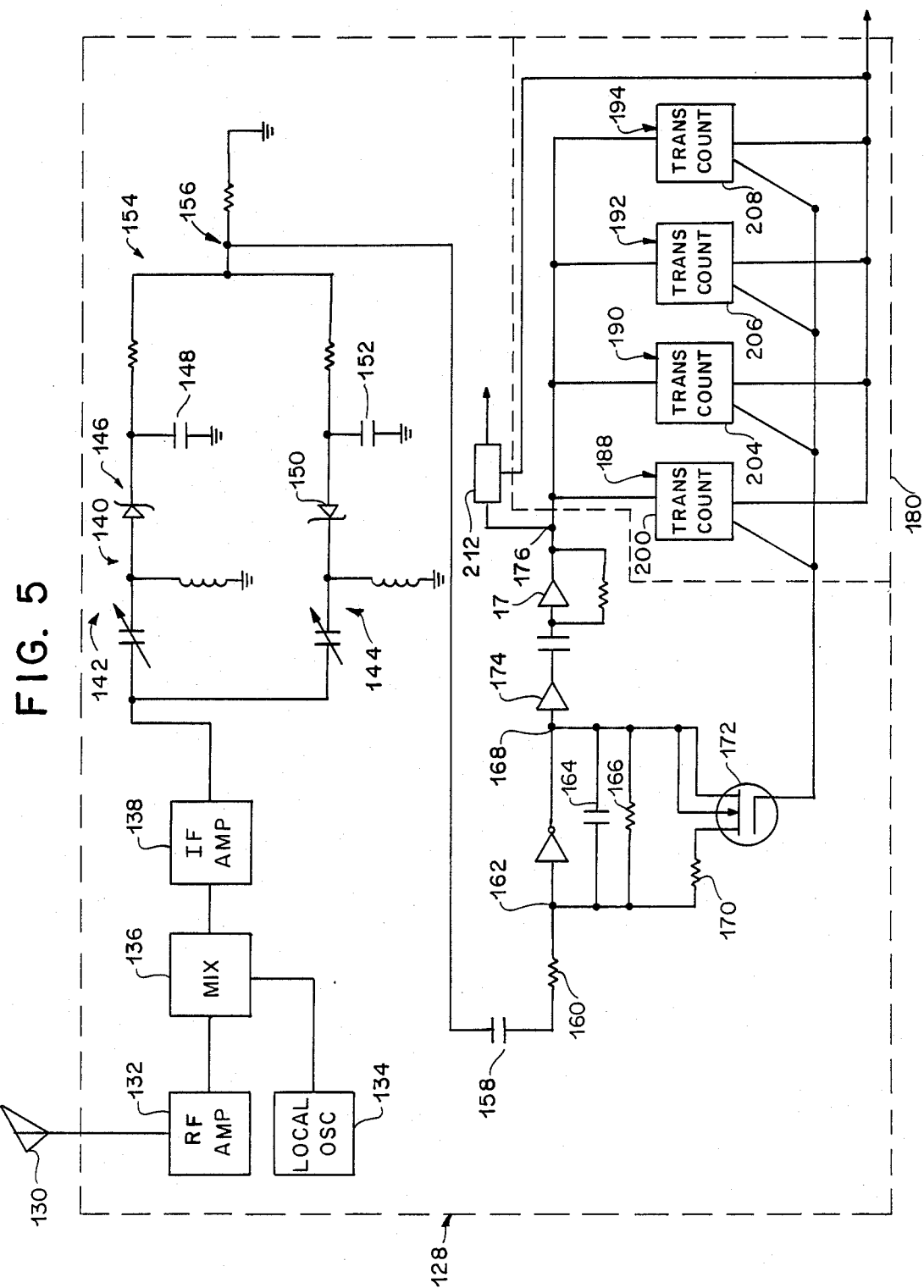
FIGS. 5 and 6 are each schematic diagrams of components utilized in the receiver of FIG. 4.

The receiver 40 includes a housing 120 (FIG. 4) dimensioned to fit within the junction boxes 38 of the building power wiring system (FIG. 1). Housing 120 is provided with mounting lugs 122 (FIG. 4) for mounting the entire receiver within the junction box. All components of the receiver are mounted within housing 120. The receiver is provided with line terminals 124 for connection to the building power wiring 32. The receiver also includes an internal power supply 126 connected across line terminals 124 so that the power supply 126 draws power for the receiver from the building power. Thus, all of the components of the receiver are continually supplied with power by power supply 126. The receiver includes a detector 128 coupled to an antenna 130. As illustrated in FIG. 5, detector 128 includes a radio frequency amplifier 132 coupled to antenna 130 and a local oscillator 134, the radio frequency amplifier and local oscillator being connected to a mixer 136. The radio frequency amplifier amplifies radio frequency signals received over antenna 130, which are mixed with signals from local oscillator 134 at mixer 136 to produce an intermediate frequency signal having frequency related to the frequency of the initial radio frequency signals. An intermediate frequency amplifier 138 amplifies the intermediate frequency signals from mixer 136. Intermediate frequency amplifier 138 operates at saturation, so that the output signals produced by the intermediate frequency amplifier are of substantially constant amplitude despite variations in the amplitude of the mixed signal received from mixer 136. These components are arranged so that the output signal of intermediate frequency amplifier 138 will be substantially at a center intermediate frequency when the incoming radio frequency signals are at the predetermined center or carrier frequency of the transmitter. The intermediate frequency in the receiver thus varies above or below the center frequency according to variations in the frequency of the radio frequency signal received at antenna 130. A demodulator 140 is coupled to the intermediate frequency amplifier 138. The demodulator includes a first resonant circuit 142 tuned to resonate at a frequency slightly above the center frequency of IF amplifier 138 and a second, similar resonant circuit 144 tuned to a resonant frequency slightly below the center frequency of the IF amplifier. Circuit 142 resonates with greater amplitude when the output of IF amplifier 138 is above the center frequency, whereas circuit 144 will oscillate with a greater amplitude when the frequency of the IF amplifier output signal is below the center frequency. Circuit 142 is coupled via a diode 146 to a capacitor 148, so that capacitor 148 tends to accumulate a positive charge proportional to the amplitude of the oscillations in circuit 142. Circuit 144 is coupled via an oppositely oriented diode 150 to a capacitor 152, so that capacitor 152 tends to accumulate a negative charge proportional to the amplitude of the oscillations in circuit 144. These capacitors are connected through a resistive network 154 to a node 156 where the voltage on the capacitors are added to one another. The resultant voltage at the node will go progressively more positive as the frequency of the IF amplifier output goes above the center frequency and progressively more negative as the IF amplifier output goes below the center frequency. As the IF frequency is representative of the frequency in the radio signal, the voltage at node 156 constitutes a detector signal representative of the frequency in the radio signal received at antenna 130.

Node 156 is coupled through a capacitor 158 and a relatively low value resistor 160 to an integration node 162. Node 162 is connected to the input of a CMOS gate arranged to act as an amplifier, and provided with a feedback capacitor 164 and a high value feedback resistor 166 arranged between node 162 and the output node 168 of the gate. A low value shunt resistor 170 and switching field effect transistor 172 are connected in series between nodes 162 and 168. While switching FET 172 is in a conducting mode, the output 168 of the amplifier is shunted back to node 162. Node 168 is connected via a squaring circuit including a pair of CMOS gates 174 to final detector output node 176.

When a FM signal having alternating periods of high and low frequency impinges on antenna 130, the voltage at detector signal node 156 will oscillate accordingly. With FET switch 172 conducting, the voltage at integrating node 162 will tend to approach the time average value of the detector signal at node 156. The voltage at node 176 will jump back and forth between high and low levels, depending on whether the instantaneous voltage at node 156 is greater or less than the voltage at node 162. With FET switch 172 in a nonconducting mode, the action is the same, except that the voltage at node 162 is essentially locked, and it does not change to reflect any change in the time average value of the detector output signal at node 156.

Detector 128 is connected to crumb level comparison and selection unit 180, which in turn is connected to a chip interval series generator 182 driven by the master clock 184 of the receiver. The master clock of the receiver typically is arranged to provide clock pulses so that each master clock pulse represents a small fraction of a chip interval as employed by the transmitter, but an integral number of receiver master clock pulses equal one chip interval. Also, there are an equal number of receiver master clock pulses in a halfchip or "crumb" interval as employed by the transmitter. Chip interval series unit 182 counts master clock pulses to define four separate series of chip intervals, 188, 190, 192 and 194, all shown in FIG. 3 as a plot against time. The duration of each chip in each chip interval series is equal to the duration of one chip interval as employed by the transmitter. Also, each chip in each chip interval is subdivided into half-chip or crumb intervals equal in duration to the crumb intervals employed by the transmitter. For example, chip 188(a) of series 188 is subdivided into crumb 188(b) and crumb 188(c). The other chip interval series have chips of the same duration subdivided in the same manner. However, the chip interval series are offset from one another by a predetermined offset interval 196 equal to one fourth of the chip interval. Crumb level comparison and selection unit 180 includes transition counters 200, 204, 206, 208 (FIG. 5) each arranged to receive one of the chip interval series. The transition counters are linked to the final output node 176 of detector 128. Each transition counter is arranged to compare the output level at node 176 prevailing during the first crumb interval in each chip of a series with the level at the same node during the second crumb interval of the same chip, and to determine whether there is an appreciable difference between these two levels. If there is such a difference, there is a transition between the two crumbs of the chip. Each transition count unit 200–208 is arranged to count the number of consecutive chips within which there are such transitions.

As mentioned above in connection with the transmitter, the RF signal emitted by the transmitter 40 includes a preamble portion carrying the Manchester encoded preamble chips. The frequency of the RF signal varies substantially as indicated by curve 78 (FIG. 3) i.e., slewing between high and low frequencies at the transitions between the two crumbs of each chip as established by the transmitter clock signal 76. When this portion of the transmitted signal impinges on the receiver, the detector signal at node 156 will vary likewise, and the detector output at final output node 176 will likewise slew back and forth between high and low levels according to the same pattern shown by curve 78. As will be apparent from FIG. 3, there will be good transitions between levels for the two crumbs in each chip only for one of the four chip interval series 188, 190, 192 and 194. That chip interval series is in synchronization with the chip intervals of the transmitter. Thus, chip interval series 190 is out of synchronization with the transmitter chip interval series by one fourth of one chip. Within chip 190(a) the detector output voltage at node 176 transitions between high and low in the middle of crumb interval 190(b) and between low and high in the middle of crumb interval 190(c). The average level during both of these crumb intervals will be the same. Thus there is no meaningful transition. In series 194, there is a similar lack of meaningful transitions between the crumb interval of chip interval 194(a). Chip interval series 192, out of synchronization with the transmitter chip interval series by one-half chip interval will have some chips with good transitions between crumb intervals, but will not have good transitions, for example, between the crumb intervals of chip 192(a). However, series 188, which is in synchronization, will have good transitions between crumb intervals for all of the chip intervals in the series. Thus, the count of consecutive chip intervals having good transitions in counters 204, 206 and 208 will never approach the predetermined number regarded as establishing synchronization. However, the count in counter 200 will promptly reach this number, thus indicating that series 188 of chip intervals is in synchronization with the chip intervals of the transmitter. At this time, count unit 200 outputs chip interval series 188 as the decoding series of chip intervals to be used in further processing of the signal received by the receiver.

During this transition-counting process, the receiver is exposed to the transmitted radio signal carrying the Manchestered preamble signal for an appreciable length of time. As pointed out above, the Manchestered signal is DC-free. It incorporates equal periods of high and low values. Thus, the time average frequency of the transmitted radio frequency signal during the transition-counting period is necessarily equal to the carrier frequency of the transmitter. The voltage level accumulated at node 162 to this time represents the time average of the detector output at node 156 responsive to this portion of the transmitter signal. That is, the voltage at node 162 at this time represents a reference value corresponding to the detector output for a received signal having frequency equal to the actual center or carrier frequency of the transmitter. This is true even where the transmitter center frequency is slightly different from the expected frequency, or even if the local oscillator 134 mixer 136, IF amplifier 138 or the modulator 140 have drifted somewhat from their expected performance characteristics. Crumb-level comparison means 180 provides a lock signal when it counts the predetermined number of good transitions, thus rendering switching FET 172 nonconducting so as to lock the voltage at node 162 to a reference value useful in interpreting further signals. Detector outputs above this reference value will result in high signals at node 176, whereas outputs below at this reference value will provide low signals. However, the reference value itself will not change regardless of the subsequent signal content.

Once chip level clock synchronization has been established, the output at node 176 is employed to provide a stream of binary chip values. Thus, the output at node 176 is applied, for separate periods corresponding to individual chip intervals, as via an output switch 212 operating in synchronization with the selected decoding sequence of chip intervals. During any remaining portion of the preamble signal sent by the transmitter, the voltage at node 176 will be varying substantially as indicated by curve 78 (FIG. 3). Thus, during each chip interval the voltage at node 176 will swing back and forth between the high and low values, and the total output for each chip interval thus will be indeterminate. However, as soon as the information bearing portion of the transmitted signal arrives, the output at node 176 will reflect the non-Manchestered chips representing the synchronization, address and command bits. Thus, the output at node 176 will be substantially as shown in curve 72 (FIG. 3) with definitive transitions between high and low voltages, and with these transitions occurring only at transitions between successive chip intervals. Thus sampling at detector output gate 212, according to the selected decoding sequence of chip intervals will provide a sequence of definitive high and low values reflecting one and zero binary values for the transmitted chips.

The particular scheme for selecting a receiver chip interval sequence in synchronization with the chip intervals of the transmitted sequence described above can be varied. For example, the transmitter clock signal 76 (FIG. 3) may have a higher frequency, so as to subdivide each chip interval into more than two crumb integrals. With such a higher frequency clock signal Manchester encoded with the preamble chip sequence, the frequency of the transmitted signal at the receiver, would slew up and down several times during each preamble chip interval. The receiver may general more than four separate chip sequences, and may subdivide each chip in each such sequence into a number of crumb intervals equal to the number of crumb intervals per chip used by the transmitter. The receiver would test the detector signal for presence of more than one transition per chip during each chip of each sequence. With a four crumb per chip scheme, there should be three transitions per chip, viz, one transition after each of the first, second and third crumbs of each chip. With a four crumb per chip scheme, eight chip sequences can be used, each offset from one another by an offset interval equal to one-eighth of a chip interval. In general, with a Manchester encoding scheme, there should be Z-1 transitions per chip, where Z is the number of crumbs per chip, and the offset interval between chip sequences can be (1/2Z) times the chip interval.

Schemes other than Manchester encoding may be used to impress the transmitter clock signal on the preamble chip sequence, and transmitter clock signals other than the simple alternating waveform described above can be used. In general, however, the transmitter clock signal should include a series of discrete values for each crumb interval, and the receiver should test each chip of each sequence against a template corresponding to these values and select the best fitting sequence. Thus, in the preferred two crumb per chip scheme discussed above, the template test is the test for presence of the single transition at the midpoint of each chip interval. Also, it is not essential to generate all of the separate sequences of chip intervals simultaneously. Thus, if each separate sequence is delayed after another sequence by an integral number of chip intervals, in addition to the fractional chip offset interval, the system will work the same way.

Figure 6:
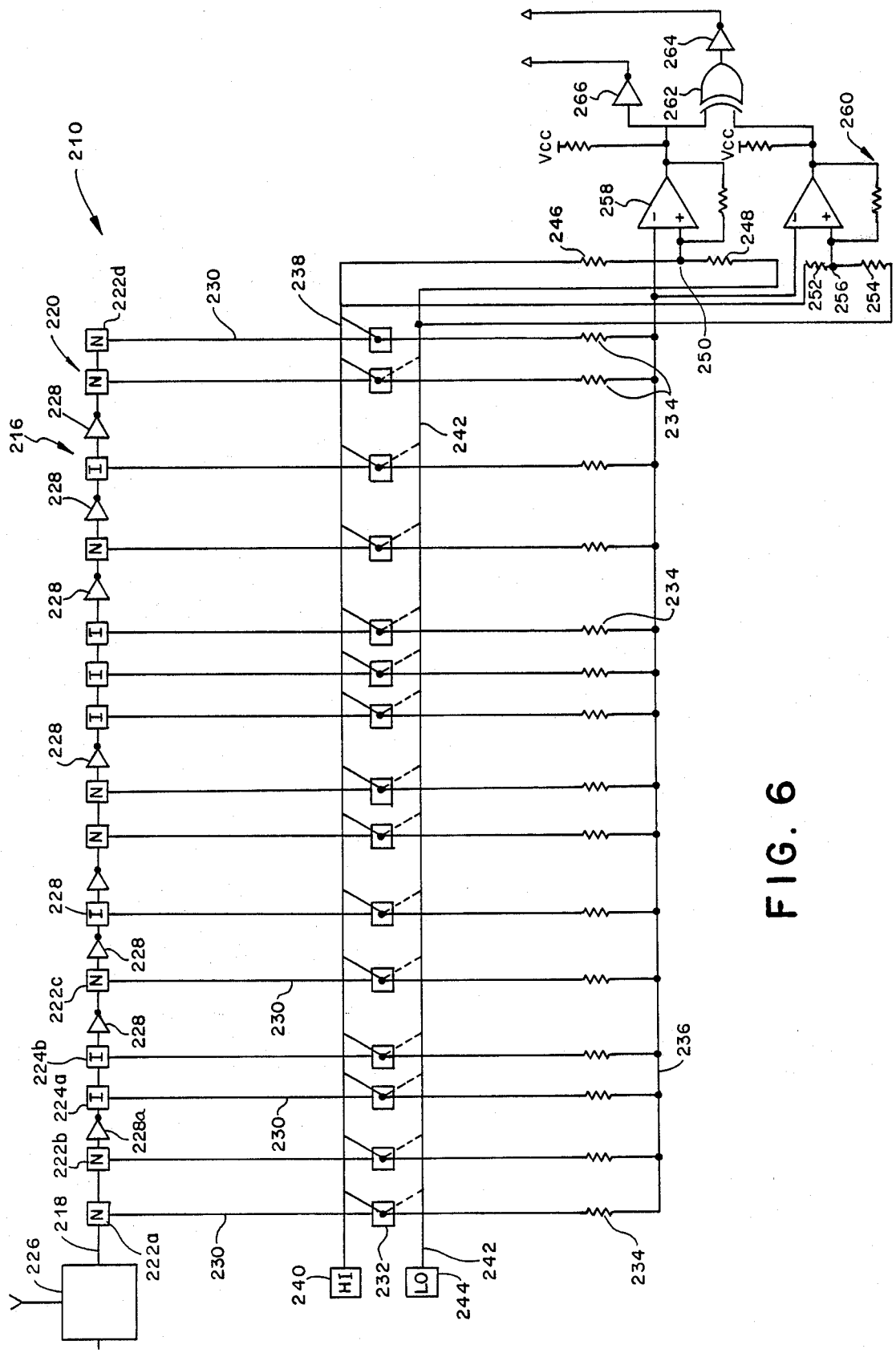

The output of detector output gate 212 passes downstream to decoding and error testing unit 210. As shown in FIG. 6, the decoding and error testing unit 210 includes a shift register having 15 positions arranged in sequence from an upstream end 218 to a downstream end 220. The 15 positions in register 216 constitute a number of positions equal to the number of chips in a single encoded bit. The register positions include "non-inversion" positions 222 and inversion positions 224. The noninversion positions 222 are also designated by the reference letter "N" in FIG. 6, where the inverting positions are designated by the letter "I" The sequence of non-inversion and inversion positions in the register corresponds to the sequence of one and zero values in the 15 chip sequence representing a "1" value bit in the information chipping code applied by the transmitter, with the most downstream position in the register corresponding to the leading chip value in the sequence. Thus, in the information chipping code a bit value of 1 is represented by the chip value sequence 1 (leading chip), 1, 0, 1, 0, 0, 0, 1, 1, 0, 1, 0, 0, 1, 1 (trailing chip), with 1 value chips in the first, second, fourth, eighth, ninth, eleventh, fourteenth and fifteenth positions counting from the leading position. Likewise, in the sequence of non-inversion and inversion positions, the first, second, fourth, eighth, ninth, eleventh, fourteenth and fifteenth positions, counting from the downstream end of the position sequence are non-inversion positions, whereas the remainder of the positions are inversion positions.

The decoding apparatus also includes shift means 226 for accepting the binary chip values from detector 128 and advancing the chips downstream through the register position. Shift means 226 is arranged to operate cyclically, advancing the chip values one position on each cycle, and is timed to the selected chip interval sequence mentioned above. That is, at the end of each chip interval the advance means inputs another chip value into the most upstream position 222 and shifts the values previously in the register one position downstream.

Inverters 228 are connected in the register between the upstream and the downstream end so that the individual data chips pass through these registers as they progress from the upstream end to the downstream end of the register. As will be apparent from inspection of FIG. 6, the number of inverters connected upstream of any non-inversion position 222 is either zero or an even number, whereas the number of inverters connected upstream of any inversion position 224 is an odd number. The value of each chip will change as it progresses through the register. A chip which originally has a value of 1 will retain that value as it progresses through the most upstream non-inversion positions 222A and 222B. On the next cycle of the shift means 226, this chip will be inverted, as it passes through inverter 228A, into a zero value occupying inversion position 224A. On the succeeding cycle of the shift means, the same chip will be positioned in inversion position 224B, and will remain at zero value. After yet another succeeding cycle, the same chip will be inverted once again to a 1 value and will occupy non-inversion position 222C. Conversely, a chip which has original value zero when supplied to the decoder unit will retain its original 0 value while in noninversion positions 222A and 222B, will have the inverse value (1) while in inversion positions 224A and 224B and will revert back to its original value (0) when positioned in non-inversion position 222A. Thus, on each cycle of shift means 226, each chip which is in a non-inversion position 222 will have its original value, whereas each chip which is in an inversion position 224 will have the value inverse to its original value.

Each register position is provided with a position output line 230. On each cycle of register 216 and shift means 226, each position output line 230 delivers a binary position output representing the chip value occupying the associated register position on that cycle. Each position output line 230 is connected to the control input of a switching gate 232. Each switching gate in turn is connected to one terminal of a position resistor 234. The opposite terminal of each position resistor 234 is connected to an output bus 236. A high voltage bus 238 is connected to a source 240 of a predetermined high voltage, so that bus 238 is always maintained at the predetermined, high voltage, whereas a low voltage bus 242 is connected to a source 244 of a predetermined low voltage, so that bus 242 is always maintained at a predetermined low voltage, lower than the voltage on bus 238. Each switching gate 232 is arranged to connect the associated position resistor 234 between high voltage bus 238 and output bus 236 when the position output on the associated position output line 230 is 1 and to connect the position resistor between the low voltage bus 242 and the output bus 236 when the position output on position output line 230 is 0. Thus, the switching gates and position resistors operate to convert the binary position outputs on output lines 230 into analog signals, i.e., the analog voltages corresponding to connection of the position resistor to either the high voltage bus 238 or the low voltage bus 242. As all of these position resistors 234 have substantially identical values, the high and low analog outputs produced by each position resistor will be substantially the same.

The voltage on bus 236 at any time will be a composite of the voltages imparted through the individual position resistors 234, and hence will represent a composite analog output. Where all of the position resistors are connected by the respective switching gates 232 to the high voltage bus 238, the composite voltage will be equal to the high voltage provided by source 240. Where all of the position resistors 234 are connected to the low voltage bus 242, the composite output on bus 236 will be equal to the low voltage provided by source 244. For connection of some position resistors to the high voltage bus and some to the low voltage bus, the composite output on bus 236 will be between these extremes.

A network including low value resistor 246 and high value resistor 248 connected between high voltage bus 238 and low voltage bus 242 provides a first reference voltage at a node 250, whereas a second high value resistor 252 and low value resistor 254 connected oppositely to resistors 246 and 248 between the high and low voltage buses 238 and 242 produce a second reference voltage at a further node 256. The values of resistors 246 and 248 are selected so that the first reference voltage at node 250 is equal to the voltage on bus 238 less a predetermined tolerance value. This tolerance value is chosen so that the voltage at node 250 is just slightly less than the voltage produced when 14 of the 15 position resistors 234 are connected to the high voltage bus and one is connected to the low voltage bus 242. Conversely, the values of resistors 254 and 252 establish the second reference voltage at node 256 at a level equal to the voltage on low voltage bus 242 plus a predetermined tolerance selected so that this second, lower reference voltage at node 256 is just slightly greater than the voltage produced on output bus 236 when 14 of the 15 position resistors 234 are connected to low voltage bus 242 but the remaining position resistor 234 is connected to the high voltage bus 238.

A first comparator 258 compares the composite output voltage on bus 236 with first or higher reference voltage 250. This comparator 258 delivers a low or binary zero signal when the composite output voltage exceeds the first reference voltage but otherwise delivers a high or binary one value. A second comparator 260 compares the output voltage on bus 236 with second reference voltage 256. Comparator 260 delivers a high or binary one output when the voltage on bus 236 is less than the second or lower reference voltage 256, but otherwise delivers a low or binary zero output. An exclusive OR gate 262 receives the outputs of comparators 258 and 260, the output of the exclusive OR gate being connected to an inverter 264. Another inverter 266 receives the output of first comparator 258 directly.

When a sequence of chip values corresponding to a bit value of 1 is advanced downstream through shift register 216 by shift means 226, and aligned in the register positions with the leading chip in most downstream register position 222D, every one of the 15 binary position outputs on lines 230 will be binary 1's That is, each of the chips in the sequence which originally had chip value one will be disposed in a non-inverting position 222, whereas each of the chips in the sequence which originally had a chip value of zero will be disposed in one of the inverting positions 224. In this condition, with all binary one position outputs, all of the position resistors 234 will be connected to high voltage bus 238, and hence the voltage on output bus 236 will also equal the voltage on bus 238. Accordingly, the voltage on the output bus will exceed the first reference voltage at node 250. First comparator 258 will thus deliver a zero output. Inverter 266 will deliver a binary one output. In this condition, the voltage on output bus 236 will be greater than second or lower reference voltage 256. Accordingly, second comparator 260 will likewise deliver a zero or low output signal. Exclusive OR 262 will also deliver a zero output and inverter 264 will deliver a one output. The same outputs occur with a similar chip sequence having one incorrect chip value; even with one incorrect chip value, the composite output voltage on bus 236 will still be greater than the higher or first reference voltage at node 250.

When a sequence of chips representing a zero bit in the information chipping code is similarly aligned in shift register 216, the situation will be reversed. Thus, those chips originally having value zero will be aligned in the non-inversion positions, whereas those chips originally having value one will be aligned in the inversion positions. All of the binary position outputs on position output lines 230 will have value zero, and hence all of the position resistors 234 will be connected to low voltage bus 242. Accordingly, the composite output voltage on bus 236 will be less than the lower or second output voltage at node 256. Therefore, second comparator 260 will deliver a one or high output value. As the composite analog output voltage in this condition is also less than the first or higher reference voltage at node 250, the first comparator 258 will also deliver a one or high output. In this condition, the output of inverter 266 will be zero, and, because both comparator outputs are the same the output of exclusive OR gate 262 will be zero and hence the output of inverter 264 will be one. The same condition occurs with a chip sequence corresponding to the 0 bit chip sequence but with one incorrect chip value causing connection of one position resistor to the high voltage bus 238.

Where the original values of the chips aligned in the positions of register 216 do not match either the one bit or zero bit chip sequence, the binary position outputs on lines 230 will be neither uniformly one nor uniformly zero. Provided that the mismatch involves two or more chips in the 15 chip sequence, two or more of the position resistors 234 will be connected to each of buses 238 and 242. Accordingly, the composite analog output voltage at bus 236 will be less than the first reference voltage at node 250 but greater than the second or lower reference voltage at node 256. In this mismatch or indeterminate condition, first comparator 258 will deliver a high or one output, whereas a second comparator 260 will deliver a zero or low output. Thus, inverter 266 will deliver a zero output, exclusive OR gate 262 will deliver a one output and hence inverter 264 will deliver a zero output. A zero output from inverter 264 thus indicates that the chip value then aligned in the register do not constitute a valid bit signal. Stated another way, decoding and error testing unit 210 provides outputs as indicated in Table 1 on each cycle, i.e., on each chip interval.

TABLE 1

| Condition | Output of Inverter 266 | Output of Inverter 264 |
|---|---|---|
| Bit Value 1 Chip Sequence With One or No Erroneous Chip Values | 1 | 1 |
| Bit Value 0 Chip Sequence With One or No Erroneous Chip Values | 0 | 1 |
| Any Other Chip Sequence | 0 | 0 |

While the preamble signal from the transmitter is being received, the values input into register 216 from detector 128 will not match either the 1 value or 0 value chip sequences. However, when the first information chip in the transmitted signal is received at detector 128, it will produce a sequence of chip values corresponding to a 1 bit value. Decoder and error tester 210 thus will produce, at inverters 266 and 264, the signals indicating a valid bit value. This first bit value signal passes to a bit sequence index initializer 268, which responds by setting a bit sequence index to an initial value. This same bit sequence is then incremented by a bit sequence index increment unit or clock 270. The bit sequence clock 270 increments the bit sequence interval at bit intervals corresponding to 15 chip intervals. At the end of each bit interval, the bit sequence clock 270 enables bit control logic 272 to check the outputs of decoding and error testing unit 210. If, at the end of a bit interval, the output of unit 210 indicates that the chip sequence then aligned in the register is not a valid bit sequence, a bad-bit signal is dispatched to action/inhibit unit 274, which resets the entire receiver to its original condition so that the receiver will disregard the remainder of the message and produce no external output. As will be appreciated, the output of the decoding error testing unit typically will indicate an invalid chip sequence condition at times between the ends of bit intervals, while a new chip sequence is still being fed into the register. Therefore, the bit control logic only dispatches the bad-bit signal to the action/inhibit means 274 if this condition persists at the end of a bit interval, when a valid chip sequence should be fully aligned in the shift register.

Provided that no such bad-bit signal occurs, and the receiver operation continues, bit sequence clock 270 and bit control logic 272 will dispatch each of the 16 bit value signals received from unit 210 to an address bit comparison unit 276. On each of these bit intervals, the bit sequence clock 270 will trigger receiver address reader 278 to read one bit of a 16 bit receiver address encoded on a card 280. Receiver address reader 278 includes column conductors 282, row conductors 284 and card holder 286. The receiver address reader operates in exactly the same way as transmitter address reader 88 (FIG. 2) to read the 16 bits of the receiver address from card 280 in the order established by the bit sequence index, i.e., the first through sixteenth bits of the address encoded on the card, one bit per bit interval. The address bits read from the card 280 by reader 278 are output, as read, to address bit comparison unit 276. If, on each bit interval, the value of the address bit received from bit control logic 272, matches the value received from reader 278, the address bit comparison unit provides a valid address bit signal to action/inhibit means 274. If there is a mismatch on any bit interval, the address bit comparison unit 276 provides a bad-address signal to the action/inhibit logic 274. Upon receipt of such a bad-address bit signal, the action/inhibit logic resets the receiver, and the remainder of the transmitted signal is ignored.

When the bit sequence index maintained by bit clock 270 indicates that the next bit output from decoding error testing unit 210 is the seventeenth bit after the synchronization bit, that bit value is not compared with any address bit but instead is delivered (provided it is a valid bit value) to action/inhibit means 274. That bit value is the command bit value transmitted by the transmitter following the address bit values. Action/inhibit means controls solenoid action switch 288 in accordance with the value of that command bit. If the command bit is a one, the action/inhibit means closes the solenoid switch 288 or leaves it closed where it is already closed. If the command bit is a zero, the solenoid switch 288 is opened or left open. Thus, provided that all bits (including the command bit) are valid, and provided that the address bits received correspond to the address stored on card 280, the receiver will connect or disconnect power from the building power supply line 32 to a load.

Although the internal functions of the receiver and transmitter as described above are complex, these functions occur automatically. The user turning a light on or off by means of the wireless remote control system 30 merely operates a single push-button just as in actuating an ordinary switch. Also, it is easy to establish any desired pattern of association between transmitters and receivers. Each transmitter will actuate all receivers having the same address code as the transmitter and located within transmission range. Each receiver will accept commands from every transmitter having an address identical to the address stored in the receiver, but from no other transmitter. Therefore, to establish associations between transmitters and receivers, the user need only insert identically coded cards 108 and 280 into those transmitters and receivers which are to work with one another. For example, both transmitters 46B and receiver 40B have identically coded cards, which in turn are different from the cards in all of the other units in the building. Because the card stores a 16 bit address, there are $2^{16}$ or 65,536 possible addresses. Therefore, the possibility of unwanted interaction between transmitters and receivers is almost nil. Systems in neighboring residences or neighboring portions of a large building will not activate devices because different address codes will be used by different users.

The system is essentially immune to unintended actuation of its final output means or solenoid switch by interfering signals or random noise; the possibility of any such spurious radio signal simulating the chipping code is low, and the probability of any such spurious signal simulating both the chipping code and the encoded receiver address is almost vanishingly small. There is some possibility that an interfering signal may cause chip error. The chip error tolerance built into the decoder will allow operation to proceed even if a single chip is obliterated. Moreover, because the transmitter is arranged to retransmit the entire signal three times over, at least one such retry will almost always be successful. To reduce the possibility of a missed signal even further, each receiver unit can be provided with a reply transmitter, and each transmitter unit may be provided with a reply receiver. The receiver unit may be arranged to query the transmitter unit for a further retransmission using the reply transmitter and reply receiver. Thus, if the receiver receives some specified part of a complete signal but reception is terminated by a bad-bit signal, the receiver would emit a retransmit query via the reply transmitter. Alternatively, the receiver can be arranged to transmit an acknowledgement signal using the reply transmitter after a complete signal is received. The transmitter may be arranged to continue retransmissions until the acknowledgement signal is received or until some large number of retransmissions have been made, whichever first occurs.

In the system described above, only a single command bit is actually employed to perform a simple on/off function. As will be appreciated, the number of command bits in a signal is substantially unlimited. The transmitter in a system using more than one command bit may have input devices other than the simple pushbutton devices discussed above as, for example, a keyboard, modem or other telephone input device or the like. Also, the transmitter would be arranged to transmit multiple command bits in predetermined sequence, and the bit control logic of the receiver would be arranged to assign the different command bits to different functions according to a similar predetermined pattern using the bit sequence index or count maintained within the receiver. Also, the addresses of the transmitter, the receiver or both may be maintained on storage media other than the encoded cards referred to above. Thus, either or both of these devices can be provided with a read-only memory, switch array, hand-wired system of interconnections, optical reader, contact-type card reader, or the like for storing and/or reading the address of the unit. However, the cards with information bearing elements mentioned above are particularly preferred inasmuch as they are low in cost and easy for a layman to program. Thus, the information-bearing elements 110 (FIG. 2) on each card may be adhesive metal foil labels. These may be provided on the card so that the user can program a desired address simply by pulling off some of the labels. Also, a transmitter may be provided with multiple address codes and switch means for selecting one or the other address codes so as to reach different receivers on different transmissions.

In a variant particularly suitable for use with a centralized automation system, both the address bits and the command bits would be supplied from the automation system for each transmission. Thus, the transmitter would include appropriate means such as an input connection for accepting these bits from an external source, but need not include any storage device per se for storing the address. Also, the system may be arranged for two-way transmission of information, apart from the acknowledgement or retransmit signals mentioned above. Thus, each transmitter and each receiver may be part of a transceiver unit. The transmitter of such transceiver unit of a controlled device could be employed to send feedback signals back to a receiver at a central automation system to thereby provide closed loop control.

In additional variants, the balance between sensitivity to interference and the possibility of unwanted actuation by spurious signals can be altered by altering the tolerance applied to the individual chip sequences. Thus, merely by changing the value of resistors 246, 248, 252 and 254 (FIG. 6) in the detector and error checking unit 210 the values of the reference voltages used to check the composite analog output signal can be adjusted so as to allow either no erroneous chip values in a chip value sequence denoting a bit or to allow more than one chip value error in a sequence while still providing the valid bit outputs. Also, the number of chips in an information bit can be either more or less than the 15 chips utilized in the above described systems.

Figure 7:
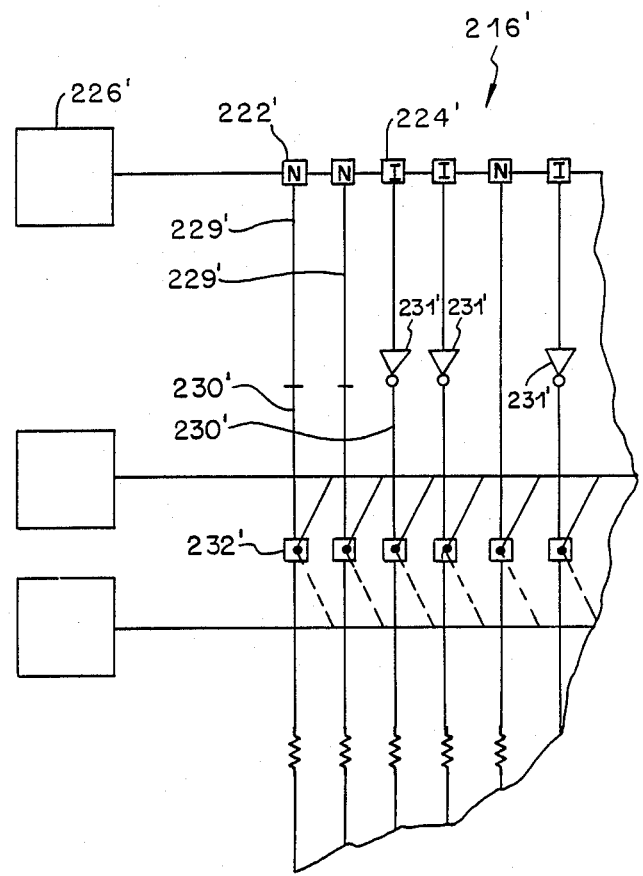
FIGS. 7 and 8 are fragmentary schematic views showing portions of receivers according to further embodiments of the invention.

In a further variant, a different arrangement of the shift register is employed. Thus, the shift register 216' shown in FIG. 7 does not have any inverters between its various register positions. Therefore, each chip retains its original value as it is advanced downstream through the various positions of the register. Each register position will deliver, via an intermediate output line 229' feeding directly from the register position, an intermediate binary output equal to the original value of the chip in that register position, i.e., a binary value equal to the value which the chip had when it was first introduced into the register. For each non-inversion position, the intermediate output line is connected directly to the position output line 230' of the position and hence to the associated switching gate 232'. However, for each inversion position an inverter 231 is interposed between the intermediate output line 229' and the position output line 230'. Thus, the intermediate position output on line 229' for each inversion position 224' is inverted and this inverted intermediate output is delivered to the associated switching gate 232' as the binary position output for the inverting position. Thus, the relationships between the original values of the chips when first introduced into the shift register 216' and the binary position outputs ultimately delivered to switching gates 232' for the arrangement of FIG. 7 is the same as for the arrangement of FIG. 6. In other respects, the system works the same way as described above.

Figure 8:
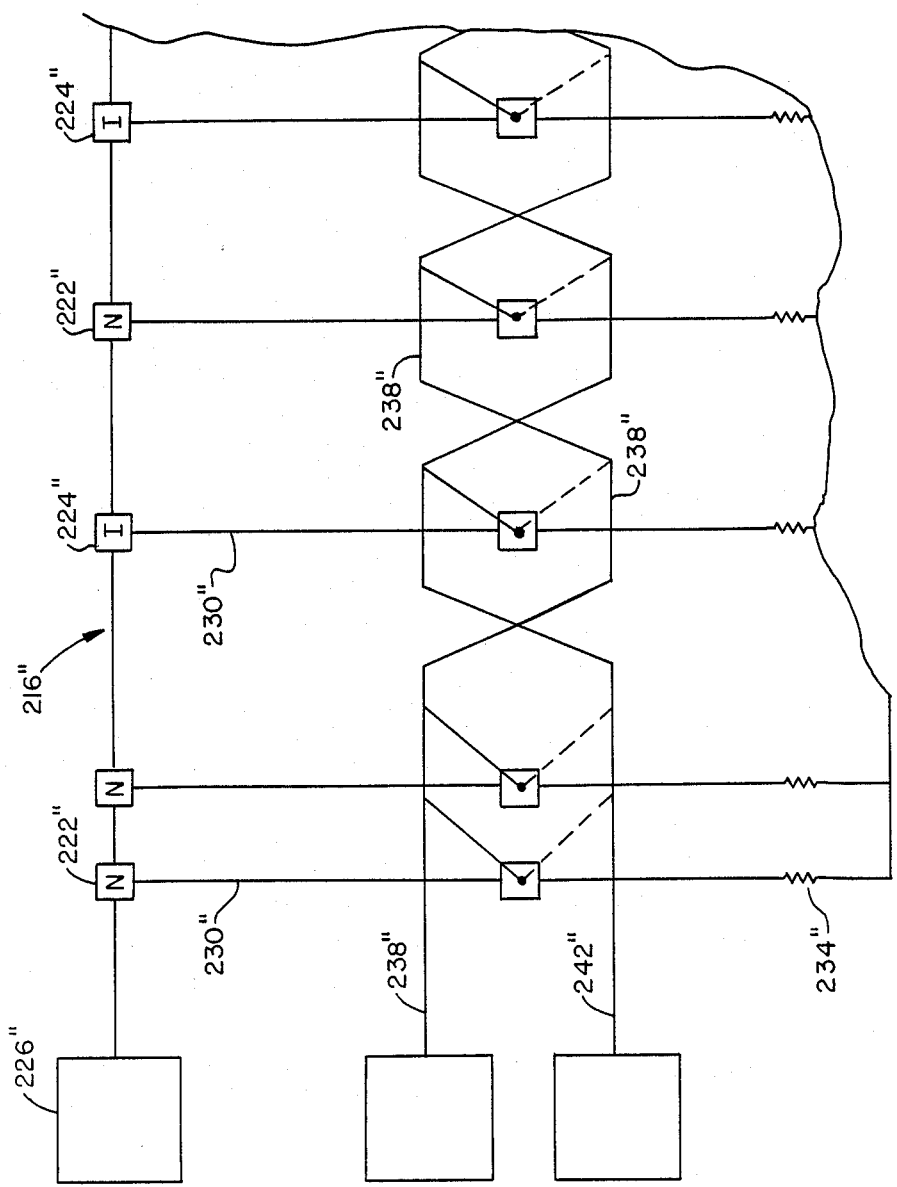

In a further variant of the decoder, the inversions included in the transformation scheme are performed by the analog output means. Thus, register 216" (FIG. 8) uses no separate digital inverters. Thus, the binary position output on the position output line 230" of each register position will be equal to the original chip value as initially supplied by shift means 226". The switching gate 232" associated with each non-inversion position 222" is arranged to connect the associated position resistor 234" to the high voltage bus 238" when the binary position output on line 230" is 1, and to the low voltage bus 242" when the binary position output is 0. The connections of the switching gate 233" associated with each inversion position 224" are reversed, so that each switching gate will connect the associated position resistor 234" to the low voltage bus 242" when the binary position output on the associated line 230" is 1, and to the high voltage bus 238" when the binary position output is 0. Thus, although there is no separate digital-domain transformation, the overall transformation from original chip values to analog output signals is the same as discussed above.

Figure 9:
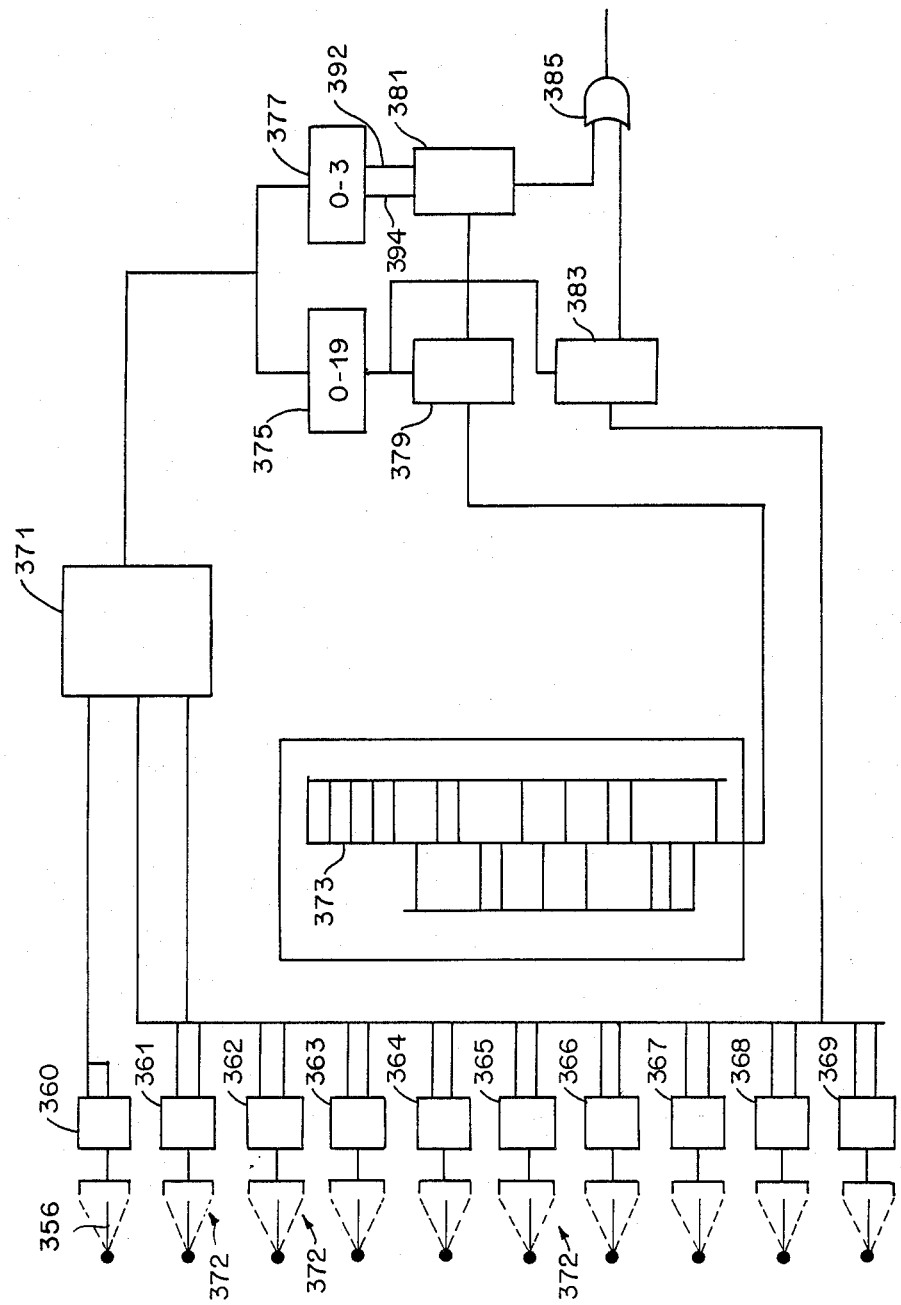
FIG. 9 is a block diagram of a transmitter in accordance with a further embodiment of the invention.

A transmitter according to a further embodiment of the invention utilizes different address storage and encoding schemes. As shown in FIG. 9, the command means 360 includes an input threshold device 360, coupled to a manually actuable momentary switch 356. Threshold device 360 generates one of three different 2-bit sequences corresponding to the three possible positions of switch 356, i.e., high, low, or "float," intermediate between high and low. Nine further input threshold devices 361-369 are provided. Each of these devices is coupled to a switch 372. Switches 372 are arranged so that they can be set to high, low, or float positions by a punched card (not shown), and so that they will retain their positions after setting. These switches thus store a transmitter address as imparted by the card. Each of the input threshold devices 361-369 generates a 2-bit sequence corresponding to the status of the switch 372 to which it is coupled. Input threshold device 360 is coupled to a clock and control mechanism 371 which ensures that upon actuation of the switch 356, momentary oscillations of the switch do not engender spurious signals. The clock and control mechanism 371 "debounces" the switch signals Thus, it eliminates transient signals owing to temporary bouncing of the switch 356. Further, clock and control mechanism 371 regulates the operations of the encoder as described below.

The 18 bits generated by the input threshold devices 361-369 represent a programmed address, and the 2 bits generated by the input threshold device 360 represent a command. The encoding components shown in FIG. 9 assemble these bits into a 20-bit message with the address bits leading the command bits, and encode each bit into sequence of four chips according to either an A code or a B code, depending on the position of the individual bit within the message.

Under code A, a 0 bit becomes chip value 0101 and a 1 bit becomes 1010. Under coding B, 0 becomes 0011 and 1 becomes 1100. The use of the different codes on the different bits in the message corresponds to the overlay code or sequence of chipping codes AAAAABAABBABABAABBBA. That is, each bit of the 20 bit programmed address and command message is replaced by the corresponding sequence of 4 chips of the chipping code that occupies the same position in the overlay code sequence as the bit under consideration does in the 20 bit address and command message. For example, if the first bit in the message signal is 1, then it will be replaced by 1010 since the code occupying the first position in the overlay code sequence is A. If the 6th bit in the message is a 0, then it will be replaced by 0011, since the B code occupies the 6th position of the code sequence. To determine the chip sequence for a particular bit in the message, find the code occupying the same position in the overlay code sequence and select the 4 bit sequence from that code corresponding to the bit in question. Each of the 4 bit sequences in the A and B codes contains an equal number of 0 and 1 bits. This coding technique thus provides a DC-free message.

Referring again to FIG. 9, an overlay code sequencer 373 provides a signal comprising a sequence of 20 bits corresponding to the overlay code sequence above wherein A is represented by a 0 bit and B is represented by a 1 bit. A 0-19 bit sequence counter 375 and a 0-3 chip sequence counter 377 are coupled to the clock and control mechanism 371. A 20:1 input multiplexer or "mux" 383 is coupled to the input threshold devices 360-369, and a 20:1 overlay mux 379 is coupled to the overlay code sequencer 373. The 0-19 bit sequence counter 375 is coupled to the 20:1 overlay mux 379 and to the 20:1 input mux 383. The 0-3 counter 377 is coupled to a 2:1 coding mux 381 along two coupling lines 392 and 394. Counter 377 is arranged to count off the numbers 0-3 in binary code as the 2-bit sequences 00, 01, 10 and 11, to deliver the most significant bit of each such sequence on line 394 and to deliver the least significant bit of each sequence on line 392. The output of overlay mux 379 is applied as the control to coding mux 381. An exclusive OR gate 385 is coupled to the output of coding mux 381, and to the output of 20:1 input mux 383.

Clock and control unit 371 counts off 80 chip intervals upon actuation of momentary switch 356 to any position other than "float." 0–3 chip sequence counter 377 is incremented on each count, whereas 0–19 bit sequence counter 375 is incremented on every fourth count. On each increment of bit sequence counter 375, one bit of the overlay code sequence is output by the overlay code sequencer 373 to overlay mux 379. Also, on each increment of bit sequence counter 375, one bit of the 20-bit message is output by the input threshold devices 360–369 to input mux 383. Thus, on each count of bit sequence counter 375, overlay mux 379 delivers a bit value representing either A or B coding, whereas input mux 383 delivers an information bit (address or command bit) to be encoded. The address bits are delivered first, followed by the command bits.

The overlay code bit output by mux 379 is conveyed to the coding mux 381, which selects either line 392 or line 394, depending on the value of this bit. For each count of bit sequence counter 375, there are 4 counts of the chip sequence counter 377. As chip sequence counter 377 counts off the sequence 00, 01, 10, 11 (0–3 in binary code), line 392 will carry the sequence 0101, whereas line 394 will carry the sequence 0011. In response to a 0 overlay code bit from mux 379 identifying the A code, coding mux 381 selects line 392 and delivers the values on this line as its output. Thus, mux 381 will output the chipping code sequence, 0101, one chip on each chip count of counter 377. Thus, one chip of this A-chipping code sequence is delivered by coding 381 to exclusive OR gate 385 on each chip interval. This A-chipping code sequence is combined by XOR gate 385 with the message bit value delivered by input mux 383 to produce a sequence of chip values, and thus to encode the message bit value according to the A code. If mux 383 outputs a message bit value 1, then this 1 value will be applied to the exclusive OR gate 385 for all of the four-chip intervals. That is, the inputs to the exclusive OR gate 385 will be, on each chip interval: 10, 11, 10, and 11, thereby providing an output from gate 385 of 1010. This output corresponds o the bit sequence in the A code corresponding to 1. In this fashion, the information bit value 1 encoded into the corresponding chip sequence 1010 of the A code.

If the output of the mux 379 remains 0, indicating the A code, and a 0 information bit value is output by output mux 383, then the inputs to the exclusive OR gate 385 will be 00, 01, 00, and 01, on successive chip intervals. The output of the exclusive OR gate 385 will be 0101 which is the bit sequence of the A code corresponding to 0. If an overlay code bit of value 1 is output by the overlay mux 379, which identifies the B code, then the coding mux 381 outputs the sequence of values delivered on line 394. Thus, the coding mux 381 sends the chipping code sequence 0011 to XOR 385, one chip for each count of the counter 377 and hence one chip for each chip interval. If a 0 information bit value is output by input mux 383, then this 0 is applied to one input of the exclusive OR gate 385 for the 4 counts of the counter 377. That is, the inputs to the exclusive OR gate 385 are, for the four counts of the counter 377, respectively, 00, 00, 01, and 01. The output of the exclusive OR gate 385 is, accordingly, the sequence of chip values 0011. In this fashion, the 0 information bit value output by mux 383 is encoded into the corresponding chip sequence of the B code.

Similarly, if a 1 information bit value is output by the mux 383 when a 1 (B-code) value is output by the mux 379, then corresponding to the counts of the counter 377, the inputs to the exclusive OR gate 385 are 10, 10, 11, and 11. This provides an output of the exclusive OR gate 385 of 1100 which is the chip sequence of the B code corresponding to a 1 bit value. In this fashion, a 1 bit value is encoded into the chip sequence 1100 of the B code. Thus, each information bit in the message is replaced by a corresponding chip sequence of the A or B code according to the overlay code sequence. This encoded signal comprising 80 chips (20 4-chip bit groups) is impressed on a carrier signal and broadcast by the transmitter. The carrier signal, modulation and related components of the transmittance similar to those described above with reference to FIG. 2.

A receiver used with the transmitter of FIG. 9 incorporates means for detecting the radio signal and recovering a stream of data chip values similar to the corresponding components of the receiver described above with reference to FIGS. 4 and 5. However, the reference value means of the detector is arranged to generate the reference or time average value of the detector signal continuously. Thus, the components which lock the reference value at node 162 in the detector of FIG. 5, such as switching FET 172, are omitted. As pointed out above, the chip sequences for the entire message in this embodiment are DC-free, so that the entire radio signal includes equal high and low periods. Thus, the time average value of the detector signal during the entire message will represent the center or carrier frequency of the radio signal. If the carrier frequency or the characteristics of the detector drift slowly during a message, the reference or time-average value of the detector signal will drift in the same fashion.

Figure 10:
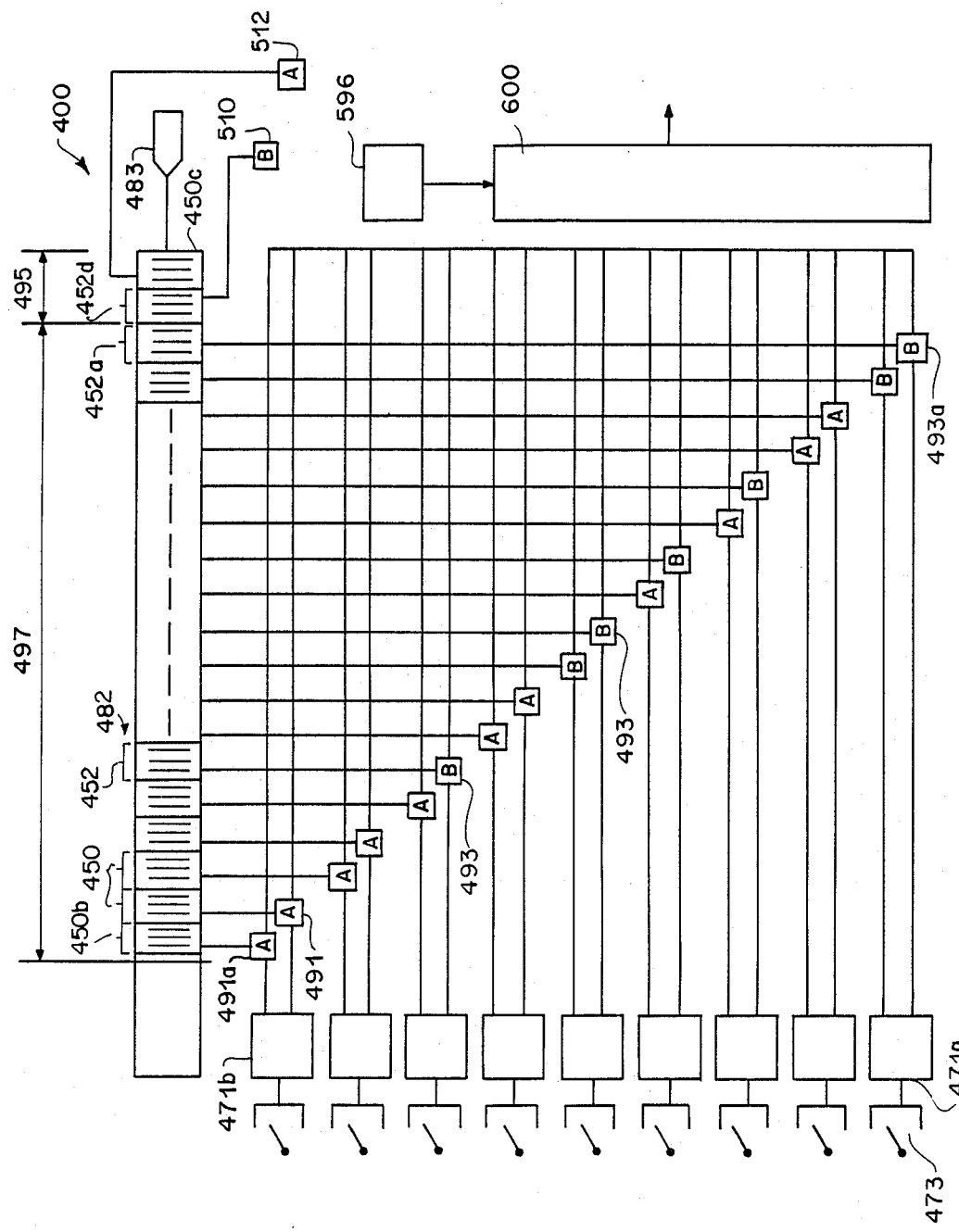
FIGS. 10, 11, 12, and 13 are each block diagrams of a receiver according to another embodiment of the invention.

The receiver in this arrangement includes interpretation apparatus 400 (FIG. 10), which receives the stream of 1 and 0 chip values recovered by the detector. This interpretation means includes a chip clock and advance unit 483. Clock and advance unit 483 is coupled to the shift register 482 and clocks the chip values, from the detector, into the shift register 482 in sequence. The 80 positions in register 482 are arranged in blocks of four positions each, including "A" blocks 450 and "B" blocks 452. Each A-block 450 is connected to an A decoder 491 or 510, whereas each B block is connected to a B decoder 493 or 512. The order of A and B blocks in register 482 corresponds to the order of A and B chip codes established by the overlay code discussed above in connection with the transmitter of FIG. 9. The two most downstream blocks in register 482 define a command section 495, whereas the remaining 18 blocks define an address section 497. When the 80 chip sequence generated by the transmitter of FIG. 9 is aligned in register 482, the two 4-chip sequences representing the command bits are in the blocks of command section 495, whereas the 18 4-chip sequences representing the address bits are aligned in the address section 497. Because the order of A an B blocks 450 and 452 in the register matches the overlay code, each 4-chip group which was originally encoded (at the transmitter) according to the A code will be aligned in an A block, whereas each 4-chip group originally encoded according to the B code will be aligned in a B block.

Reference address storage means including threshold devices 471 and switches 473, similar to the threshold devices and switches of the transmitter are also provided. Each threshold device 471 outputs two bit values representing two bits of a reference address encoded by the associated switches 473. Each of the threshold devices 471 is coupled to two of the decoding calculators 491, 493 associated with blocks in the address section 497 of the register, so that one bit output by each input threshold device is conveyed to one of the decoding calculators and the other bit output by the input threshold device is conveyed to the other calculator. The threshold devices and decoding calculators are connected so that the reference address bits from threshold devices are delivered to the decoding calculators in sequence. Thus, decoding calculator 493a, associated with the most downstream block 452a in the address section 497 of the register receives a bit from threshold device 471a representing the first or leading bit in the reference address, whereas decoding calculator 491b, associated with the most upstream block 450b in the address section of the register receives the last bit in the reference address from threshold device 471b.

Figure 11:
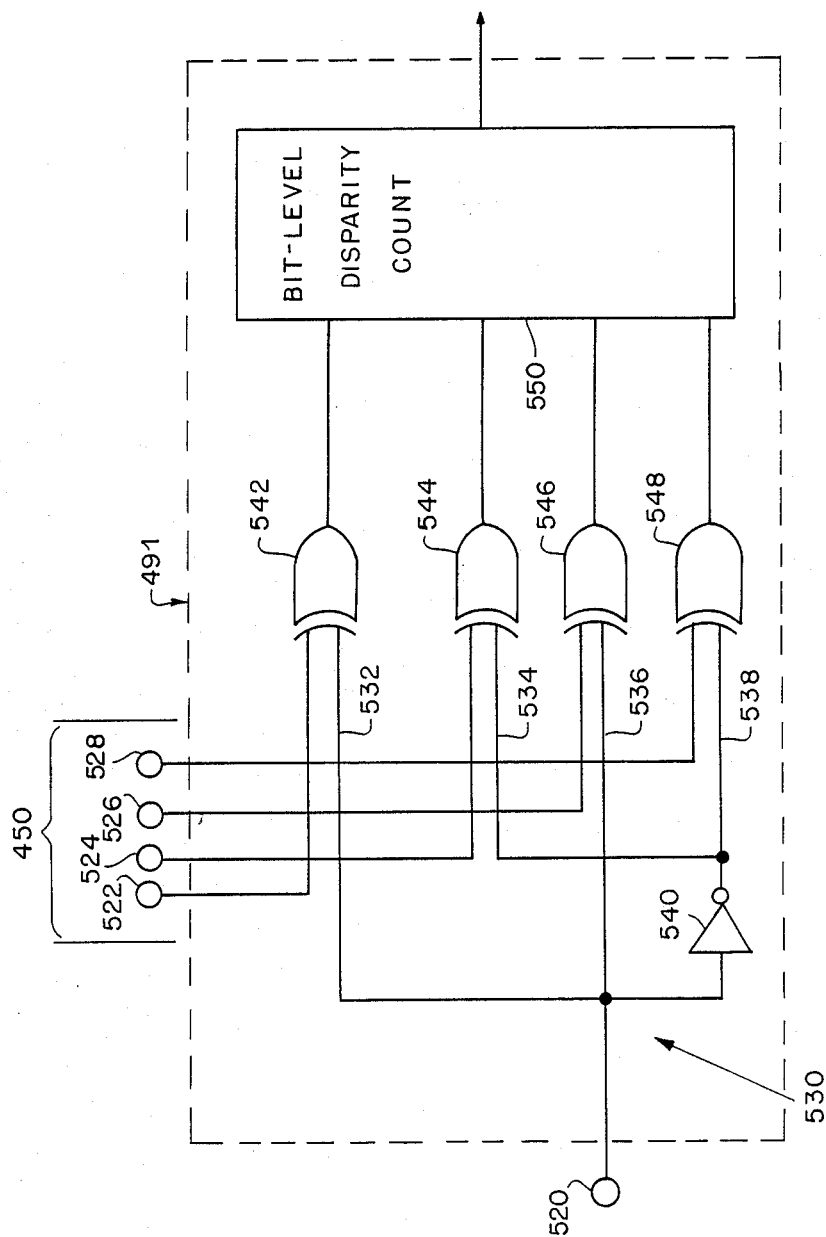

As shown in FIG. 11, each A decoding calculator 491 associated with the address section of the register includes an input terminal 520 coupled to the input threshold device to receive a single reference address bit value. Four input terminals 522-528 are coupled to the four positions in the associated A block 450 of shift register 482 to receive four message chip values from the register. A network 530 with four output nodes 532-538 is coupled to reference bit value input node 520. Network 530 includes an inverter 540 connected between node 520 and output nodes 534 and 538. Network 530 expands or encodes the reference bit value delivered at node 520 into an array of four reference chip values according to the "A" encoding scheme, and delivers one of these reference chip values at each of output nodes 532-538. Thus, if the reference bit input at node 520 is 0, the reference chip values will be 0, 1, 0, 1 at outputs 532, 534, 536 and 538, respectively. For a 1 reference bit value, the reference chip outputs will be 1010. The decoding calculator 491 also includes a set of four XOR gates 542-548. Each of these gates is connected to one of the message chip value input terminals 522-528, and to one reference chip output node 532-538 of network 530. Thus, each XOR gate 542-548 compares a message chip value from the register with the corresponding reference chip value. Each XOR gate provides a 1 output if these values are different, or a 0 output if they are the same. The output of each of the XOR gates 542-548 is conveyed to a bit-level disparity count device 550 which outputs the sum of the outputs of the XOR gates 542-548. As will be appreciated, this sum or disparity count will be 0 if the reference address bit delivered to the decoding calculator is 0 and the message chips in the associated register block 450 represent a 0 bit encoded in the A chip code. The same will be true if the reference bit value is 1 and the chips in block 450 represent the A code for a 1 bit value. Any difference between the reference address bit and the address bit carried by the chips in the register block, or any erroneous chip values (as from interference or the like) will result in one or more disparities which will be reflected in the count from bit level disparity count means 550.

Thus, the A-decoding calculator 491 decodes the 4-chip sequence from the associated block of register positions 450 in that it determines whether or not the bit value conveyed by the 4-chip group matches the reference bit value from input node 520. The decoding calculator 491 simultaneously error-checks the chip values from register position block 450.

Figure 12:
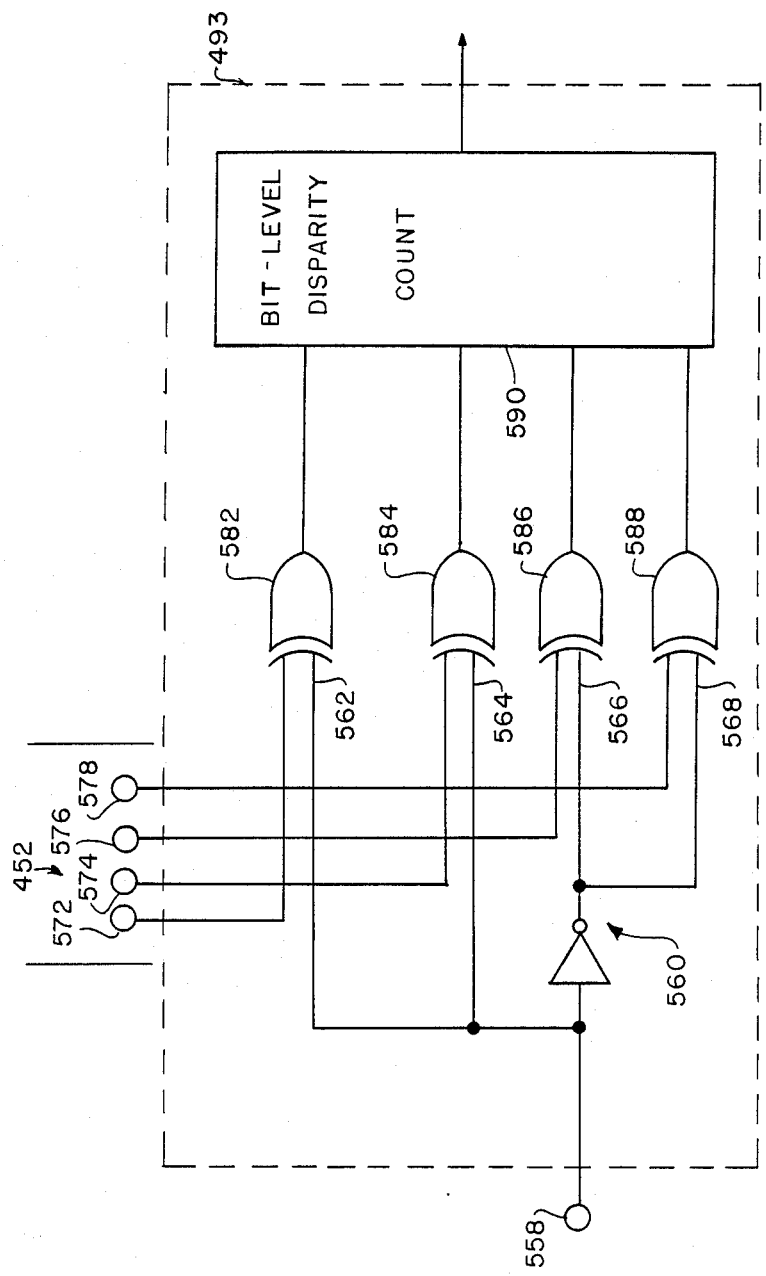

Each of the B-decoding calculators 493 associated with the B-blocks 452 of register positions in the address section 497 of the register is the same as the A-decoding calculator except that the network 560 of the B-decoding calculator (FIG. 12) is arranged to expand the reference bit value received through input node 558 into reference chip values at output nodes 562, 564, 66 and 568 according to the B-code. Thus, where a 1 reference bit value is delivered to input node 558 of a B-calculator from one of the threshold devices 471 (FIG. 10), the reference chip values will be 1, 1, 0, 0 at nodes 562-568 (the B-code for a 1 bit value) If a 0 reference bit value is delivered to reference bit value input node 558, the reference chip values at output nodes 562-568 will be 0011 (the B-code for a 0 bit value). The B-calculator 493 receives actual message chip values from chip value input terminals 572-578, each connected to one register position in a 4-chip B-block 452 of the register, and compares the actual message chip values with the reference chip values at XOR gates 582-588. Disparities, if any, are tallied at bit level disparity counter 590.

Figure 13:
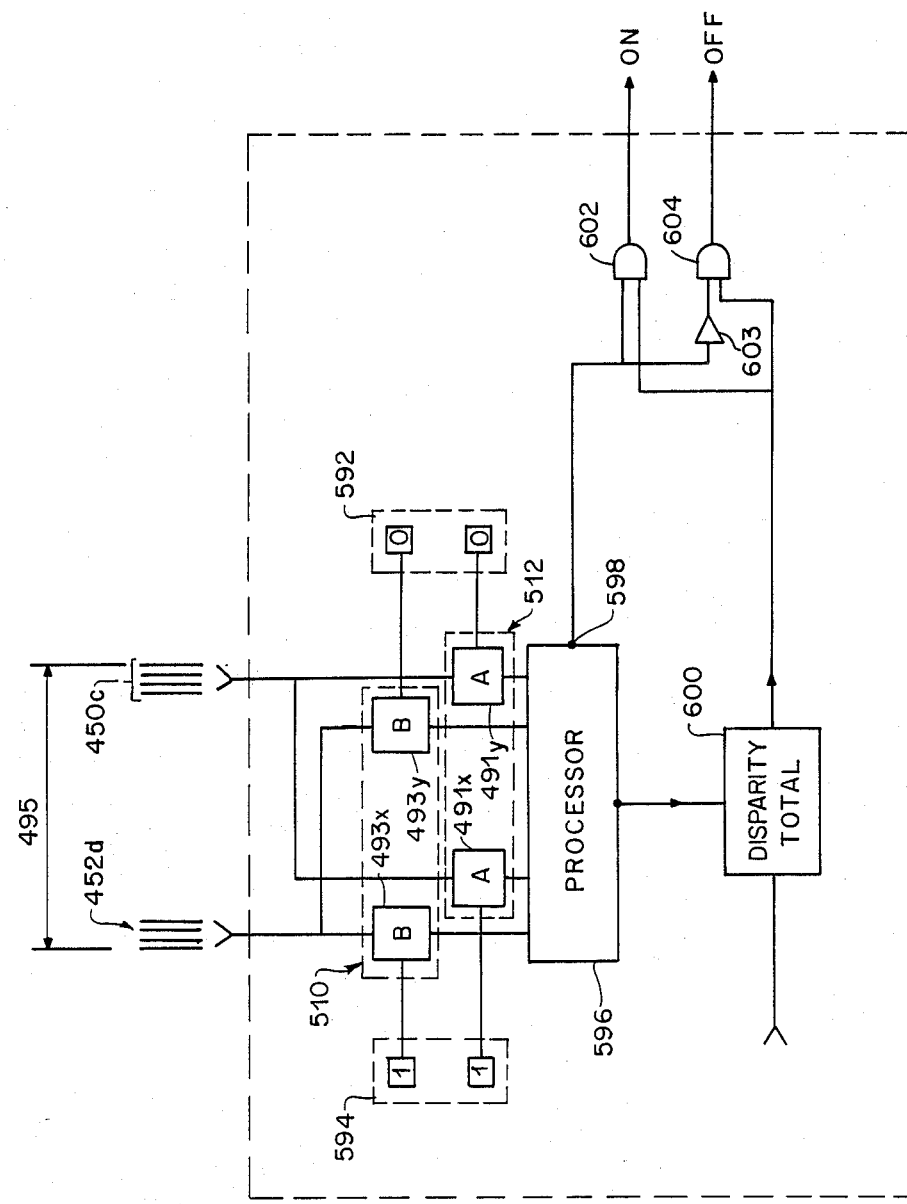

The decoders 510 and 512 associated with the blocks in command zone 495 of register 482 operate in the same way as the other decoders 491 and 493 used in the address zone. However, as shown in FIG. 13, the B-decoder 510 associated with B-block 452d in command zone 495 incorporates two separate B-decoding calculators 493x and 493y, whereas the A-decoder 512 associated with A-block 450C in the command zone includes two A-decoding calculators 491x and 491y as described above. Thus, each of the A and B decoders used in the command zone can perform two separate comparisons with two different reference bit values. First reference command means 592 provides a first set of command bit values (0, 0) representing a first possible command signal, whereas a second reference command means 594 provides a further set of command bit values (1, 1) representing a second possible command.

The command bit values 0, 0 in the first set represent a "off" command, whereas the command bit values 1, 1 in the second set represent an "on" command. Thus, the chip sequence in each of blocks 452d and 450c of the command zone 495 in the register is compared with chip sequences representing the two possible bit values for the two possible commands. Calculator 493x of B-decoder 510 and calculator 491x of a decoder 512 compare the chip sequences in blocks 452d and 450c, respectively, against the chip sequences representing the reference command bit value sequence 1, 1, whereas calculators 493y and 491y compare the chip sequences against chip sequences representing the reference command bit values 0, 0. The disparity counts from calculators 493x and 491x are totaled by a processor 596 to provide a total disparity count as between the actual message chip sequences and the chip sequences representing the command bits 1, 1. Likewise, processor 596 totals the disparity counts from calculators 493y and 491y to provide a disparity count as between the actual chip sequences and the chip sequences representing the other possible command bits (0, 0). Processor 596 selects the lower one of these two disparity counts and provides a command output signal at node 598. If the combined disparity counts from calculators 493x and 491x is lower than the combined disparity count from calculators 493y and 491y, processor 596 provides a 1 value at node 598, indicating that the command signal is an "on" command whereas if the other disparity total, from calculators 493y and 491y is lower, processor 596 provides a 0 output at node 598, indicating a "off" command.

Processor 596 also outputs the lower of these two disparity totals to disparity total counter 600. Disparity total counter 600 receives the lower disparity total from processor 596, and also receives all of the bit level disparity counts from all of the decoding calculators 491 and 493 associated with the address zone 497 (FIG. 10) in the register. The disparity total counter 600 provides a 0 output if the total of all of the disparity counts which it receives is 3 or more, thereby indicating that the message should be rejected. If the total disparity counts amount to 3 or less, disparity total counter 600 provides a 1 output, indicating that the message should be accepted.

As will be appreciated, messages having incorrect addresses, different from the reference address stored by switches 473 and threshold devices 471 (FIG. 10) in the receiver will be rejected, as the incorrect bit values will produce large disparity counts. Messages with corrupted chip codes will produce excess disparity counts and hence will be rejected as well. A valid message will be rejected while the 80-chip sequence is advanced into register 482, but will be accepted when the chip sequence is properly aligned in the register.

The on-off, 1 or 0 output of processor 598 is coupled to an on AND gate 602, which also receives the accept or reject signal from disparity total counter 600. The on-off output from node 598 of the processor is also coupled via an inverter to an off AND gate 604, which also receives the accept/reject signal from disparity total counter 600. With a reject or 0 signal from disparity total counter 600, both AND gates 602 and 604 will emit 0 outputs regardless of the on-off signal from node 598. With a 1 or accept signal from disparity total counter 600, on AND gate 602 will emit a 1 output for a 1 value or on signal from processor node 598, whereas off AND gate 604 will emit a 1 or off signal when the on-off output of processor node 598 is 0. The outputs of gates 602 and 604 are used to control a solenoid actuated switch or other action device as for connecting or disconnecting the load to the power line in the building or appliance.

As will be appreciated, numerous variations and combinations of the features described above can be utilized without departing from the present invention. Merely by way of example, more than two possible command signals can be used in a system as described with reference to FIGS. 9-13. Thus, the command zone 495 of the register may include more than two blocks of positions to accommodate a message with more than two command bits. Three or more sequences of reference command bits representing three or more possible commands can be encoded into reference chip sequences. Separate disparity counts can be taken for each such reference chip sequence, and the command with the lowest disparity count may be selected. Also, the DC-free coding and overlay coding approach utilized in the embodiment of FIGS. 9-13, can be combined with a decoder construction as shown for example in FIGS. 7, 8 or 9. Further, in a system using an overlay code and two different chipping codes, the chip sequences representing different bits in the message can be routed to two different decoders according to a bit sequence index, rather than fed into a register and routed to the different decoders by register positioning as described with reference to FIGS. 9-13. As these and other variations and combinations of the features described above can be used without departing from the invention as defined in the claims, the foregoing description of the preferred embodiments should be taken as illustrating rather than as limiting the invention as defined in the claims.

What is claimed is:

1. A receiver for receiving and decoding a transmitted signal wherein a predetermined parameter is varied to carry a digital message including one or more preamble bits encoded into one or more preamble chip sequences according to a preamble code followed by a plurality of information bits encoded into information chip sequences according to an information code different from said preamble code, the receiver comprising:
    (a) recovery means for recovering an output stream including said information chip sequences and output representative of said preamble chip sequences from said transmitted signal;
    (b) decoding means for emitting information bit value signals responsive only to said information chip sequences, said decoding means being coupled to said recovery means so that said decoding means will receive said output stream from said recovery means; and
    (c) bit-level synchronization means for initializing a bit sequence index in response to emission of an initial information bit value signal by said decoding means.

2. A receiver as claimed in claim I wherein said recovery means includes detector means for providing a detector signal representative of said predetermined parameter in said transmitted signal, reference value means for providing a reference value clock means for timing a decoding sequence of predetermined chip intervals and chip-level comparison means for comparing the average value of said detector signal during each said chip interval with said reference value and assigning a first binary value or a second binary value to each said chip interval depending on whether the average value of said detector signal during the chip interval is greater than or less than the reference value.

3. A receiver as claimed in claim 2 further comprising means for determining the mean value of said detector signal during transmission of said one or more preamble bits, adjusting means for adjusting said reference value substantially to said mean value of said detector signal during transmission of said preamble bits, and lock means for disabling said adjusting means so that said adjustment is not continued after transmission of said preamble bits.

4. A receiver as claimed in claim 3 wherein said detector means includes means for providing said detector signal in response to a radio frequency signal so that said detector signal is representative of the frequency of said radio frequency signal.

5. A receiver as claimed in claim 2 further comprising clock synchronization means for setting said clock means during transmission of said preamble bits to generate said decoding sequence of predetermined chip intervals in synchronization with the chip intervals of said chip sequences in said transmitted signal.

6. A receiver for receiving and decoding a transmitted signal wherein a predetermined parameter is varied to carry a digital message including one or more preamble bits encoded into one or more preamble chip sequences according to a preamble followed by a plurality of information bits encoded into information chip sequences according to an information code different from said preamble code, the receiver comprising:

(a) recovery means for recovering an output stream including said information chip sequences and output representative of said preamble chip sequences from said transmitted signal, said recovery means including detector means for providing a detector signal representative of said predetermined parameter in said transmitted signal, reference value means for providing a reference value, clock means for timing a decoding sequence of predetermined chip intervals and chip-level comparison means for comparing the average value of said detector signal during each said chip interval with said reference value and assigning a first binary value or a second binary value to each said chip interval depending on whether the average value of said detector signal during the chip interval is greater than or less than the reference value;

(b) clock synchronization means for setting said clock means during transmission of said preamble bits to generate said decoding sequence of predetermined chip intervals in synchronization with the chip intervals of said chip sequences in said transmitted signal including means for generating plural separate sequences of chip intervals, each offset from another sequence by a predetermined offset interval, subdividing each chip interval of each said sequence into a plurality of crumb intervals, crumb-level test means for testing the detector signal for the crumb intervals in each said series against a predetermined template corresponding to a predetermined series of clock signal values, and means for selecting one of said separate series for which said detector signal in the various crumb intervals of each chip best matches said template and outputting the so-selected series of chip intervals as said decoding sequence;

(c) decoding means for emitting information bit value signals responsive only to said information chip sequences, said decoding means being coupled to said recovery means so that said decoding means will receive said output stream from said recovery means; and (d) bit level synchronization means for initializing a bit sequence index in response to emission of an initial information bit value signal by said decoding means.

7. A receiver for receiving and decoding a transmitted signal wherein a predetermined parameter is varied to carry a digital message including one or more preamble bits encoded into one or more preamble chip sequences according to a preamble followed by a plurality of information bit encoded into information chip sequences according to an information code different from said preamble code, the receiver comprising:

(a) recovery means for recovering an output stream including said information chip sequences and output representative of said preamble chip sequences from said transmitted signal, said recovery means including detector means for providing a detector signal representative of said predetermined parameter in said transmitted signal, reference value means for providing a reference value, clock means for timing a decoding sequence of predetermined chip intervals and chip-level comparison means for comparing the average value of said detector signal during each said chip interval with said reference value and assigning a first binary value or a second binary value to each said chip interval depending on whether the average value of said detector signal during the chip interval is greater than or less than the reference value;

(b) clock synchronization means for setting said clock means during transmission of said preamble bits to generate said decoding sequence of predetermined chip intervals in synchronization with the chip intervals of said chip sequences in said transmitted signal including means for generating four separate series of said predetermined chip intervals, each offset from one another by an offset interval equal to one fourth the duration of one of said predetermined chip intervals and subdividing each chip interval in each of said four separate series into two crumb intervals, crumb-level comparison means for determining whether each of said separate series of chip intervals satisfies the condition that the values of said detector signal for the two crumb intervals in each chip interval differ from one another, and means for selecting one of said separate series of chip intervals which satisfies said condition and outputting the so-selected sequence of chip intervals as said decoding sequence of chip intervals, whereby when said preamble bits in said transmitted signal are Manchester encoded with a transmitted clock signal having alternating high and low periods each having one-half the duration of one of said chip intervals, said condition will occur for only one of said separate series of chip intervals;

(c) decoding means for emitting information bit value signals responsive only to said information chip sequences, said decoding means being coupled to said recovery means so that said decoding means will receive said output stream from said recovery means; and (d) bit level synchronization means for initializing a bit sequence index in response to mission of an initial information bit value signal by said decoding means.

8. A receiver as claimed in claim 7 wherein said crumb-level comparison means includes means for determining whether the value of said detector signal during each crumb interval of each of said separate series of chip intervals is greater or less than said reference value, assigning a first or second binary crumb value to each of said crumb intervals according to said determination and means for determining whether the binary crumb values for the two crumb intervals in each chip interval of said separate sequences of chip intervals differ from one another.

9. A receiver as claimed in claim I further comprising means for incrementing said bit sequence index in synchronization with information bit value signals emitted by said decoding means.

10. A receiver as claimed in claim 9 wherein said means for incrementing includes bit clock means for incrementing said bit sequence index at predetermined incrementing intervals.

11. A receiver as claimed in claim 9 further comprising address storage means for storing a plurality of reference address bit values, and received address validation means for selecting, according to said bit sequence index, a plurality of said information bit value signals as received address bit values, comparing said received address bit values with said reference address bit values, and generating a valid address signal only when said received address bit values match said reference address bit values.

12. A receiver as claimed in claim 11 wherein said received address validation means includes cyclically operative means for selecting a single received address bit value and a single reference bit value on each cycle, comparing the values selected for the cycle and generating an error signal in the event of a mismatch between the values selected on the cycle.

13. A receiver as claimed in claim 12 wherein said address storage means includes holding means for releasably holding an information bearing element, said cyclically operative means including reading means for reading, on each cycle, one said reference address bit value from an information bearing element held by said holding means.

14. A receiver as claimed in claim 13 wherein said reading means includes a plurality of interrogation conductors and a plurality of response conductors defining a plurality of sensing locations, one said interrogation conductor being juxtaposed with one said response conductor at each said sensing location, said conductors at each said sensing location being substantially electrically isolated from one another in the absence of said information bearing element, means for selecting one said interrogation conductor and one said response conductor on each cycle of said cyclically operative means, interrogation means for energizing the selected interrogation conductor and response means for detecting the presence or absence of an output incident to said energization on the selected response conductor, said holding means including means for holding a card having electrically conductive elements at positions corresponding to some of said sensing locations so that said conductive elements of said card are disposed at said sensing locations and couple said interrogation conductors to said response conductors, whereby said reading means can detect the presence or absence of each said conductive element as a reference address bit value.

15. A receiver as claimed in claim 14 wherein each said response conductor is juxtaposed with a plurality of said interrogation conductors at a plurality of said sensing locations and said response means includes means for maintaining each said response conductor at a substantially constant potential.

16. A receiver as claimed in claim 15 wherein said interrogation means includes means for energizing the selected interrogation conductor by switching said selected interrogation conductor from a rest potential to an interrogation potential different from said rest potential, said interrogation means also including means for switching another one of said interrogation conductors juxtaposed with the selected response conductor from said interrogation potential to said rest potential simultaneously with said switching of said selected interrogation conductor.

17. A receiver as claimed in claim 16 wherein said interrogation means is arranged to switch said interrogation conductors between said rest and interrogation potentials at predetermined cycle times, each said cycle time being delayed after the preceding cycle time by a predetermined interval, said response means including means for converting a current surge on said selected response conductor into an output signal so that said output signal momentarily surges to one side of a central value upon switching of said selected interrogation conductor to said interrogation potential when one of said conductive elements is present at the sensing location defined by said selected interrogation conductor and said selected response conductor, and so that said output signal then decays towards said central value but does not reach said central value by the next cycle time.

18. A receiver as claimed in claim 11 further comprising command bit selection means for selecting, according to said bit sequence index, one or more information bit values other than said received address bit values as command bit values and emitting a command signal dependent on said command bit values if and only if said received address validation means provides said valid address signal.

19. A receiver as claimed in claim 18 further comprising action means for controlling an external device responsive to said command signal.

20. A remote control system comprising a receiver as claimed in claim 19 and a transmitter including transmitter address storage means for storing a transmitter address, selectively operable trigger means for generating an action signal, and broadcast means for generating said transmitted signal in response to operation of said rigger means so that said information bits in said transmitted signal include transmitted address bits having values representative of said transmitter address and transmitted command bits having values representative of said action signal.

21. A method of transmitting and recovering digital information comprising the steps of:
(a) transmitting a signal and varying a predetermined parameter of said transmitted signal so as to impress upon said transmitted signal a digital message including one or more preamble bits encoded into one or more preamble chip sequences according to a preamble code followed by a plurality of information bits encoded into information chip sequences according to an information code different from said preamble code;
(b) receiving said transmitted signal and recovering therefrom an output stream including said information chip sequences and output representative of said preamble chip sequences;
(c) passing said output stream through decoder means for emitting information bit value signals responsive to said information chip sequences, said decoding means being unresponsive to said output representing said preamble chip sequences; and
(d) providing bit level synchronization for initializing a bit sequence index upon emission of an initial information bit value signal by the decoding means.

22. A method as claimed in claim 21 further comprising the step of incrementing said bit sequence index in synchronization with information bit value signals emitted by said decoding means.

23. A method as claimed in claim 21 wherein said step of transmitting a signal and varying a predetermined parameter of said signal includes the step of transmitting a radio frequency signal and varying a predetermined parameter of said raid frequency signal.

24. A method as claimed in claim 21 wherein said step of receiving said transmitted signal and recovering therefrom an output stream includes the steps of providing a detector signal representing said predetermined parameter in said transmitted signal, providing a reference value, timing a decoding sequence of predetermined chip intervals, and comparing the average value of said detector signal during each said chip interval with said reference value, and assigning a first binary value or a second binary value to each said chip interval depending on whether the average value of the detector signal during the chip interval is greater than or less than the reference value, the method further comprising the steps of determining the mean value of the detector signal during transmission of said one or more preamble bits, adjusting the reference value substantially to said mean value of said detector signal during transmission of said preamble bits and then disabling the adjustment so that the adjustment is not continued during transmission of said information bits.

25. A transmitter for transmitting digital information comprising:
   (a) means for timing predetermined transmitter chip intervals;
   (b) means for generating a preamble chip signal having either a first or second binary value during each of said transmitter chip intervals and a transmitter clock signal having a predetermined series of different values for transmitter crumb intervals corresponding to division of each of said transmitter chip intervals into X equal subdivisions where X is an integer;
   (c) means for impressing both said transmitter clock signal and said preamble chip signal on a predetermined parameter of a transmitted signal so that said predetermined parameter of said transmitted signal carries said preamble chip signal encoded with said transmitter clock signal during a preamble period; and
   (d) means for impressing said digital information as a stream of binary chip values on said predetermined parameter of said transmitted signals so that said parameter varies between one value and another value according to said transmitter chip intervals after said preamble period.

26. A receiver for receiving and decoding a transmitted signal wherein a predetermined parameter is varied to carry a digital message including one or more preamble bits encoded into one or more preamble chip sequences according to a preamble followed by a plurality of information bits encoded into information chip sequences according to an information code different from said preamble code, the receiver comprising:
   (a) a recovery means for recovering an output stream including said information chip sequences and output representative of said preamble chip sequences from said transmitted signal, said recovery means including detector means for providing a detector signal representative of said predetermined parameter in said transmitted signal, reference value means for providing a reference value, clock means for timing a decoding sequence of predetermined chip intervals and chip-level comparison means for comparing the average value of said detector signal during each said chip interval of said decoding sequence with said reference value or a and assigning a first binary value or a second binary value to each said chip interval depending on whether the average value of said detector signal during the chip interval is greater than or less than the reference value;
   (b) clock synchronization means for setting said clock means during transmission of said preamble bits to generate said decoding sequence of predetermined chip intervals in synchronization with the chip intervals in said transmitted signal, said clock synchronization means including means for generating plural separate sequences of chip intervals, each offset from another sequence by a predetermined offset interval, subdividing each chip interval of each said sequence into a plurality of crumb intervals, crumb-level test means for testing the detector signal for the crumb intervals in each said series against a predetermined template corresponding to a predetermined series of clock signal values, and means for selecting one of said separate series for which said detector signal in the various crumb intervals of each chip best matches said template and outputting the so-selected series of chip intervals as said decoding sequence;
   (c) decoding means for emitting information bit value signals responsive only to said information chip sequences, said decoding means being coupled to said recovery means so that said decoding means will receive said output stream from said recovery means; and
   (d) bit-level synchronization means for initializing a bit sequence index.

27. A receiver for receiving and decoding a transmitted signal wherein a predetermined parameter is varied to carry a digital message including one or more preamble bits encoded into one or more preamble ship sequences according to a preamble followed by a plurality of information bits encoded into information chip sequences according to an information code different from said preamble code, the receiver comprising:
   (a) a recovery means for recovering an output stream including said information chip sequences and output representative of said preamble chip sequences from said transmitted signal, said recovery means including detector means for providing a detector signal representative of said predetermined parameter in said transmitted signal, reference value means for providing a reference value, clock means for timing a decoding sequence of predetermined chip intervals and chip-level comparison means for comparing the average value of said detector signal during each said chip interval with said reference value and assigning a first binary value or a second binary value to each said chip interval depending on whether the average value of said detector signal during the chip interval is greater than or less than the reference value;
   (b) clock synchronization means for setting said clock means during transmission of said preamble bits to generate said decoding sequence of predetermined chip intervals in synchronization with the chip intervals of said chip sequences in said transmitted signal, said clock synchronization means including means for generating four separate series of said predetermined chip intervals, each offset from one another by an offset interval equal to one fourth the duration of one of said predetermined chip intervals and subdividing each chip interval in each of said four separate series into two crumb intervals, crumb-level comparison means for determining whether each of said separate series of chip intervals satisfies the condition that the values of said detector signal for the two crumb intervals in each chip interval differ from one another, and means for selecting one of said separate series of chip intervals which satisfies said condition and outputting the so-selected sequence of chip intervals as said decoding sequence of chip intervals, whereby when said preamble bits in said transmitted signal are Manchester encoded with a transmitted clock signal having alternating high and low periods each having one-half the duration of one of said chip intervals, said condition will occur for only one of said separate series of chip intervals;

(c) decoding means for emitting information bit value signals responsive only to said information chip sequences, said decoding means being coupled to said recovery means so that said decoding means will receive said output stream from said recovery means; and (d) bit-level synchronization means for initializing a bit sequence index.

28. A receiver as claimed in claim 27 wherein said crumb-level comparison means includes means for determining whether the value of said detector signal during each crumb interval of each of said separate series of chip intervals is greater or less than said reference value, assigning a first or second binary crumb value to each of said crumb intervals according to said determination and means for determining whether the binary crumb values for the two crumb intervals in each chip interval of each said separate sequences of chip intervals differ from one another.

* * * * *

UNITED STATES PATENT AND TRADEMARK OFFICE
CERTIFICATE OF CORRECTION

PATENT NO. : 4,864,588

DATED : September 5, 1989

INVENTOR(S) : Raymond W. Simpson, et al.

It is certified that error appears in the above-identified patent and that said Letters Patent is hereby corrected as shown below:

Column 12, line 16, "block" should read --A block--.
Column 23, lines 67 & 68, "integrals" should read --intervals--.
Column 34, line 15, "transmittance" should read --..transmitter are...--.
Column 36, line 9, "66" should read --566--.
Column 39, line 55, "bit" should read --bits--.
Column 40, line 41, "mission" should read --emission--.
Column 40, line 53, after "interval of" insert --each--.
Column 42, line 24, "rigger" should read --trigger--.
Column 42, line 60, "raid" should read --radio--.
Column 43, line 58, after "reference value" omit --or a--.

Signed and Sealed this

Thirteenth Day of November, 1990

Attest:

HARRY F. MANBECK, JR.

*Attesting Officer*    Commissioner of Patents and Trademarks